US012624237B2

(12) United States Patent
Shiraki

(10) Patent No.: US 12,624,237 B2
(45) Date of Patent: May 12, 2026

(54) INK COMPOSITION, INK SET, AND IMAGE FORMING METHOD

(71) Applicant: FUJIFILM Corporation, Tokyo (JP)

(72) Inventor: Fumiya Shiraki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1220 days.

(21) Appl. No.: 17/396,777

(22) Filed: Aug. 9, 2021

(65) Prior Publication Data

US 2021/0363365 A1 Nov. 25, 2021

Related U.S. Application Data

(63) Continuation of application No. PCT/JP2020/004026, filed on Feb. 4, 2020.

(30) Foreign Application Priority Data

Mar. 5, 2019 (JP) ................................ 2019-039672

(51) Int. Cl.

| | |
|---|---|
| ***C09D 11/38*** | (2014.01) |
| ***B41M 5/00*** | (2006.01) |
| ***C08K 5/053*** | (2006.01) |
| ***C08K 5/19*** | (2006.01) |
| ***C08K 9/08*** | (2006.01) |
| ***C09D 11/033*** | (2014.01) |
| ***C09D 11/037*** | (2014.01) |
| ***C09D 11/106*** | (2014.01) |
| ***C09D 11/54*** | (2014.01) |

(52) U.S. Cl.

CPC ........... *C09D 11/38* (2013.01); *B41M 5/0017* (2013.01); *C08K 5/053* (2013.01); *C08K 5/19* (2013.01); *C08K 9/08* (2013.01); *C09D 11/033* (2013.01); *C09D 11/037* (2013.01); *C09D 11/106* (2013.01); *C09D 11/54* (2013.01)

(58) Field of Classification Search

CPC ... C09D 11/037; C09D 11/322; C09D 11/038; C08K 5/053; C08K 5/19; C08K 5/42

See application file for complete search history.

(56) References Cited

U.S. PATENT DOCUMENTS

| | | | |
|---|---|---|---|
| 6,536,891 B2 | 3/2003 | Oyanagi | |
| 7,030,174 B2 | 4/2006 | Yatake | |
| 8,545,000 B2 | 10/2013 | Saito | |
| 9,290,672 B2 | 3/2016 | Komatsu | |
| 9,617,440 B2 | 4/2017 | Liu | |
| 10,457,823 B2 | 10/2019 | Yasuda et al. | |
| 10,479,904 B2 | 11/2019 | Yamazaki | |
| 2006/0197814 A1 | 9/2006 | Doi | |
| 2007/0261597 A1 | 11/2007 | Sao et al. | |
| 2010/0247771 A1* | 9/2010 | Kobayashi | B41M 5/5218 427/256 |
| 2012/0320123 A1 | 12/2012 | Takeda et al. | |
| 2016/0208122 A1 | 7/2016 | Yamazaki | |
| 2020/0010709 A1 | 1/2020 | Tsurutani | |

FOREIGN PATENT DOCUMENTS

| | | | |
|---|---|---|---|
| CN | 1396945 | 2/2003 | |
| CN | 102807784 | 12/2012 | |
| CN | 102827506 | 12/2012 | |
| CN | 105658743 | 6/2016 | |
| CN | 107406701 | 11/2017 | |
| CN | 113490601 B * | 9/2022 | C08K 5/19 |
| EP | 0924272 | 6/1999 | |
| EP | 3936341 B1 * | 10/2023 | C09D 11/38 |
| JP | H09249769 | 9/1997 | |
| JP | H11263930 | 9/1999 | |
| JP | 2002155225 | 5/2002 | |
| JP | 2002302627 | 10/2002 | |
| JP | 2003201429 | 7/2003 | |
| JP | 2006241279 | 9/2006 | |
| JP | 2006274128 | 10/2006 | |
| JP | 2007302804 | 11/2007 | |
| JP | 2011042771 | 3/2011 | |
| JP | 2012153754 | 8/2012 | |

(Continued)

OTHER PUBLICATIONS

"Search Report of Europe Counterpart Application", issued on Mar. 23, 2022, p. 1-p. 5.

"International Search Report (Form PCT/ISA/210) of PCT/JP2020/004026," mailed on Apr. 14, 2020, with English translation thereof, pp. 1-7.

"Written Opinion of the International Searching Authority (Form PCT/ISA/237)" of PCT/JP2020/004026, mailed on Apr. 14, 2020, with English translation thereof, pp. 1-10.

"Office Action of Japan Counterpart Application" with English translation thereof, issued on May 24, 2022, p. 1-p. 10.

(Continued)

*Primary Examiner* — Sophie Hon

(74) *Attorney, Agent, or Firm* — JCIPRNET

(57) ABSTRACT

An ink composition includes a resin-coated pigment in which at least a part of pigments is coated with a cross-linked resin, a betaine compound (1) represented by Formula (1), and water. $R^1$ represents an alkyl group having 6 to 20 carbon atoms, $R^2$ and $R^3$ each independently represent a chain hydrocarbon group having 1 to 3 carbon atoms, $L^1$ represents a single bond or a divalent linking group, $L^2$ represents a divalent linking group, and A-represents a $—SO_3^-$ group or a $—COO^-$ group.

(1)

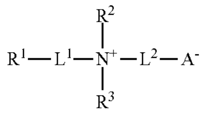

9 Claims, No Drawings

(56) References Cited

FOREIGN PATENT DOCUMENTS

| | | | | |
|---|---|---|---|---|
| JP | 2012224699 | | 11/2012 | |
| JP | 2013076028 | | 4/2013 | |
| JP | 2014111374 | | 6/2014 | |
| JP | 2016132758 | | 7/2016 | |
| JP | 2018100341 | | 6/2018 | |
| JP | 2018162430 | | 10/2018 | |
| JP | 7185012 | B2 * | 12/2022 | ................ B41J 2/01 |
| WO | 2005030888 | | 4/2005 | |
| WO | 2018173901 | | 9/2018 | |
| WO | 2018181992 | | 10/2018 | |

OTHER PUBLICATIONS

"Office Action of China Counterpart Application" with partial English translation thereof, issued on May 27, 2022, p. 1-p. 12.

* cited by examiner

INK COMPOSITION, INK SET, AND IMAGE FORMING METHOD

CROSS-REFERENCE TO RELATED APPLICATIONS

This application is a Continuation of PCT International Application No. PCT/JP2020/004026 filed on Feb. 4, 2020, which claims priority under 35 U.S.C § 119(a) to Japanese Patent Application No. 2019-039672 filed on Mar. 5, 2019. Each of the above application(s) is hereby expressly incorporated by reference, in its entirety, into the present application.

BACKGROUND OF THE INVENTION

1. Field of the Invention

The present disclosure relates to an ink composition, an ink set, and an image forming method.

2. Description of the Related Art

In the related art, ink compositions containing an amphoteric surfactant have been known.

For example, JP2014-111374A discloses, as an ink jet recording method capable of printing an image without color bleeding regardless of absorbency of a recording medium, a recording method using an ink set combined with an aqueous ink composition composed of at least a coloring material, an anionic resin emulsion, a water-soluble organic solvent, and water, and a reaction solution including a reactant which causes aggregate in a case of being in contact with the aqueous ink composition and a cationic resin emulsion, in which the ink composition further contains an anionic or amphoteric surfactant.

In addition, JP2002-155225A discloses, as an aqueous pigment ink composition set capable of preventing color bleeding or the like even at a boundary between high-lightness colors and low-lightness colors, an ink set consisting of two or more aqueous ink compositions including a dispersed pigment and a surfactant, in which (1) the ink composition having the lowest lightness has a higher surface tension than those of other ink compositions, (2) the ink composition having the highest lightness has a lower surface tension than those of other ink compositions, and the dispersed pigment contained in the ink composition having the lowest lightness and the dispersed pigment contained in the ink composition (3a) having the highest lightness are both anionic dispersed pigments or (3b) both cationic dispersed pigments, in a case where a condition (3a) is satisfied, (3a-i) the ink composition having the lowest lightness contains an anionic surfactant, and the ink composition having the highest lightness contains an amphoteric surfactant, or (3a-ii) the ink composition having the lowest lightness contains an amphoteric surfactant, and the ink composition having the highest lightness contains an anionic surfactant, and in a case where a condition (3b) is satisfied, (3b-i) the ink composition having the lowest lightness contains a cationic surfactant, and the ink composition having the highest lightness contains an amphoteric surfactant, or (3b-ii) the ink composition having the lowest lightness contains an amphoteric surfactant, and the ink composition having the highest lightness contains a cationic surfactant.

In addition, JP2003-201429A discloses, as a pigment ink for ink jet recording, which has excellent jetting stability and storage stability and can give a good recorded image even in a case of being printed on plain paper at high speed using an ink jet recording method, an ink for ink jet recording containing a polymer emulsion in which polymer fine particles contain a water-insoluble or sparingly soluble coloring material, in which the ink for ink jet recording contains at least one wetting agent (first type of hydroxy compound) selected from glycerin, 1,3-butanediol, triethylene glycol, 1,6-hexanediol, propylene glycol. 1,5-pentanediol, diethylene glycol, dipropylene glycol, trimethylolpropane, or trimethylolethane; contains at least a polyol (second type of hydroxy compound) having 8 to 11 carbon atoms or glycol ether, an amphoteric surfactant, a water-soluble organic solvent, and water; and has an ink viscosity of 5 mPa·sec or more at 25° C.

In addition, JP2006-241279A discloses, as an ink for ink jet having excellent high-temperature storage stability, an ink for ink jet containing at least a pigment, a water-soluble solvent, at least two types of surfactants, and water, in which (I) at least one type of a nonionic surfactant and at least one of an anionic surfactant and/or an amphoteric surfactant are further contained as the surfactants, (II) the nonionic surfactant has a weight-average molecular weight of 1000 or less and an SP value of 9.2 to 13, and the total number of carbon atoms and oxygen atoms in a unit constituting a hydrophilic group portion is 10 or more in the nonionic surfactant, and (III) the at least one of an anionic surfactant and/or an amphoteric surfactant has a weight-average molecular weight of 175 to 1500.

In addition, JP2006-274128A discloses, as an aqueous ink composition suitable for an ink for ink jet recording, which has high storage stability and jetting stability, has high image density with less bleeding, shading unevenness, and strike-through on plain paper, recycled paper, or the like, and has excellent glossiness without bleeding or shading unevenness in glossy media, an aqueous ink composition containing at least a coloring component, a moisturizer, a nonionic surfactant having an HLB value of 8 or less, water, and an amphoteric surfactant, in which the coloring component is a dispersion in which a colorant is included in a dispersion polymer and can be dispersed in water, the dispersion polymer is composed of a hydrophobic portion and a hydrophilic portion, at least a part of the hydrophilic portion is a neutralizing group obtained by neutralizing an unneutralized group which is a part of the hydrophobic portion, and an abundance of the neutralizing group is in a range of 20% or more and less than 60% in terms of molar ratio with respect to the sum of the unneutralized group and the neutralizing group.

In addition, JP2012-224699A discloses, as an active energy ray-curable type ink jet ink which has high photocuring sensitivity, has litter fluctuation in photocuring sensitivity even in a case of being stored for a long period of time, and can obtain high emission stability, an active energy ray-curable type ink jet ink containing at least two polymerizable compounds, each of which has a polymerizable unsaturated bond, in which the maximum value of the difference in charge of carbon atoms constituting each polymerizable unsaturated bond of the at least two polymerizable compounds is 0.24 to 0.40, and the ink has an acid value of 0.2 mgKOH/g or more and an amine value of 0.2 mgKOH/g or more.

SUMMARY OF THE INVENTION

By the way, a polychromic image may be formed by applying in layers two or more kinds of inks having different hues on a recording medium. In this case, an ink applied to an upper layer side may bleed, which causes intercolor bleeding.

According to studies of the present inventor, it has been found that the intercolor bleeding can be suppressed by containing a betaine compound having an alkyl group having 6 to 20 carbon atoms, which is one of amphoteric surfactants, to at least an ink on a lower layer side (for example, first color ink). However, according to the studies of the present inventor, it has been also found that, in a case where the ink contains the betaine compound having an alkyl group having 6 to 20 carbon atoms, storage stability of the ink may decrease.

An object of one aspect of the present disclosure to be achieved is to provide an ink composition in which intercolor bleeding in a case where two or more kinds of inks having different hues are applied in layers can be suppressed, and decrease in storage stability is suppressed; an ink set including the ink composition; and an image forming method using the ink composition.

The specific methods for achieving the objects include the following aspects.

<1> An ink composition comprising:

a resin-coated pigment in which at least a part of pigments is coated with a cross-linked resin;

a betaine compound (1) represented by Formula (1); and water.

(1)

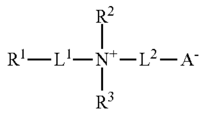

In Formula (1), $R^1$ represents an alkyl group having 6 to 20 carbon atoms, $R^2$ and $R^3$ each independently represent a chain hydrocarbon group having 1 to 5 carbon atoms, $L^1$ represents a single bond or a divalent linking group, $L^2$ represents a divalent linking group, and $A^-$ represents a $—SO_3^-$ group or a $—COO^-$ group.

<2> The ink composition according to <1>, in which a molecular weight of the betaine compound (1) is 1000 or less.

<3> The ink composition according to <1> or <2>, in which $A^-$ is the $—SO_3^-$ group.

<4> The ink composition according to any one of <1> to <3>, further comprising:

an organic solvent A which is a compound represented by Formula (A1) or Formula (A2).

(A1)

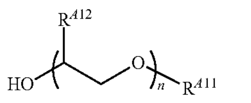

(A2)

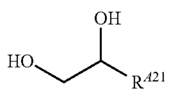

In Formula (A1), $R^{A11}$ represents a chain hydrocarbon group having 4 to 9 carbon atoms or an aryl group having 6 to 10 carbon atoms, $R^{A12}$ represents a hydrogen atom or a methyl group, and n represents an integer of 1 to 3.

In Formula (A2), $R^{A21}$ represents a chain hydrocarbon group having 4 to 9 carbon atoms or an aryl group having 6 to 10 carbon atoms.

<5> The ink composition according to <4>, in which a ratio of a mass content of the organic solvent A to a mass content of the betaine compound (1) is 0.5 to 100.

<6> The ink composition according to any one of <1> to <5>, further comprising:

a resin particle.

<7> The ink composition according to <6>, in which the resin particle includes a resin particle P consisting of a resin including a structural unit p-1 represented by Formula (p-1).

(p-1)

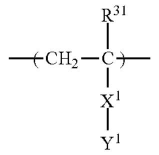

In Formula (p-1), $R^{31}$ represents a hydrogen atom or an alkyl group having 1 to 4 carbon atoms, $X^1$ represents a divalent linking group, $Y^1$ represents an anionic group, and an atom in $X^1$ and $Y^1$, which is farthest from a main chain, is a 4th atom to a 27th atom away from the main chain.

<8> The ink composition according to <7>, in which a proportion of the structural unit p-1 in the resin including the structural unit p-1 is 1% by mass to 20% by mass.

<9> An ink set comprising:

two or more kinds of inks, in which at least one of the two or more kinds of inks is the ink composition according to any one of <1> to <8>.

<10> An image forming method comprising:

a step of applying a first ink, which is the ink composition according to any one of <1> to <8>, to a recording medium; and a step of applying a second ink, which contains a coloring material and water and has a hue different from a hue of the first ink, to the first ink applied to the recording medium.

According to one aspect of the present disclosure, an ink composition in which intercolor bleeding in a case where two or more kinds of inks having different hues are applied in layers can be suppressed, and decrease in storage stability is suppressed; an ink set including the ink composition; and an image forming method using the ink composition are provided.

DESCRIPTION OF THE PREFERRED EMBODIMENTS

In the present disclosure, the numerical ranges shown using "to" indicate ranges including the numerical values described before and after "to" as the minimum value and the maximum value.

In the present disclosure, in a case where a plurality of substances corresponding to each component in a composition is present, the amount of each component in the composition means the total amount of the plurality of substances present in the composition, unless otherwise specified.

In a numerical range described in a stepwise manner in the present disclosure, an upper limit value or a lower limit value described in a certain numerical range may be replaced with an upper limit value or a lower limit value in another numerical range described in a stepwise manner, or may be replaced with values shown in Examples.

In the present disclosure, the term "step" includes not only the independent step but also a step in which intended purposes are achieved even in a case where the step cannot be precisely distinguished from other steps.

In the present disclosure, "image" means an entire film (including a coating film) formed by using an ink composition.

The concept of the "image" in the present disclosure also includes a solid image.

In the present disclosure, "(meth)acrylic acid" is a concept which includes both acrylic acid and methacrylic acid, "(meth)acrylate" is a concept which includes both acrylate and methacrylate, and "(meth)acrylamide" is a concept which includes both acrylamide and methacrylamide.

The ink composition (hereinafter, also simply referred to as an "ink") according to an embodiment of the present disclosure includes a resin-coated pigment in which at least a part of pigments is coated with a cross-linked resin, a betaine compound (1) represented by Formula (1), and water.

(1)

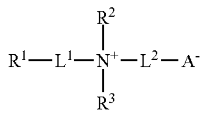

In Formula (1), $R^1$ represents an alkyl group having 6 to 20 carbon atoms, $R^2$ and $R^3$ each independently represent a chain hydrocarbon group having 1 to 5 carbon atoms, $L^1$ represents a single bond or a divalent linking group, $L^2$ represents a divalent linking group, and A represents a $—SO_3^-$ group or a $—COO^-$ group.

With the ink according to the embodiment of the present disclosure, intercolor bleeding in a case where two or more kinds of inks having different hues are applied in layers can be suppressed.

Further, with the ink according to the embodiment of the present disclosure, decrease in storage stability is suppressed.

In the present disclosure, the intercolor bleeding means a phenomenon in which, in a case where two or more kinds of inks having different hues are applied in layers to a recording medium, an ink applied to an upper layer side bleeds.

The reason why the effect of suppressing the intercolor bleeding is achieved is presumed as follows.

In a case where the ink according to the embodiment of the present disclosure (hereinafter, also referred to as a "first ink") is applied to a recording medium, a film (hereinafter, also referred to as an "ink film") formed by the first ink is formed on the recording medium. In the ink film on the recording medium, it is considered that the betaine compound (1) included in the first ink moves near a surface of the ink film (that is, a gas-liquid interface) and is unevenly distributed at a vicinity of the surface of the ink film. In the vicinity of the surface of the ink film, it is considered that the betaine compound (1) is aligned such that the hydrophobic group $R^1$ (that is, an alkyl group having 6 to 20 carbon atoms) faces a side of the gas-liquid interface and the remaining moiety faces an inside of the ink film. In this way, it is considered that the surface of the ink film (the interface with a gas phase) is hydrophobic.

In a case where another water-based ink (for example, a water-based ink of second color or later; hereinafter, also referred to as a second ink) is applied to the above-described ink film having the above-described hydrophobic surface, it is considered that mixing between the ink according to the embodiment of the present disclosure (that is, the first ink), which is a component of the ink film, and the second ink applied to the ink film is suppressed.

Therefore, by using the ink according to the embodiment of the present disclosure as at least the ink on a lower layer side (for example, ink of first color) in a case where two or more kinds of inks having different hues are applied in layers, it is considered that the intercolor bleeding in the case where two or more kinds of inks having different hues are applied in layers can be suppressed.

Here, the ink applied to the upper layer side (for example, ink of second color or later) may be the ink according to the embodiment of the present disclosure, or may be a water-based ink other than the ink according to the embodiment of the present disclosure.

According to studies of the present inventor, it has been found that, in a case where the betaine compound (1) is included in an ink containing a resin-coated pigment (specifically, an uncross-linked resin-coated pigment) in which at least a part of pigments is coated with a resin, storage stability of the ink may decrease.

The reason for the decrease in storage stability of the ink is that the betaine compound (1) interacts with the resin in the resin-coated pigment, so that the resin is peeled off from the pigment and the pigment is exposed. As a result, it is considered that the dispersion stability of the ink decreases.

Regarding the above-described problem of storage stability, in the ink according to the embodiment of the present disclosure, it is considered that the phenomenon that the resin is peeled off from the pigment is suppressed by a cross-linked resin in the resin-coated pigment.

In this way, in the ink according to the embodiment of the present disclosure, it is considered that, although the ink includes the betaine compound (1), the decrease in dispersion stability of the pigment is suppressed, and thus the decrease in storage stability of the ink is suppressed.

The ink according to the embodiment of the present disclosure can be used as various inks without particular limitation, but can be particularly suitably used as an ink jet ink.

In a case where the ink according to the embodiment of the present disclosure is used as an ink jet ink, the ink jet ink has excellent jettability from an ink jet head (hereinafter, also referred to as "ink jettability"). The reason why such an effect is exhibited is considered to be the same as the reason why the decrease in storage stability of the ink is suppressed.

Hereinafter, each component which can be included in the ink according to the embodiment of the present disclosure will be described.

<Betaine compound (1)>

The ink according to the embodiment of the present disclosure includes at least one betaine compound (1).

The betaine compound (1) is a betaine compound represented by Formula (1).

(1)

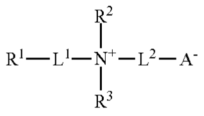

In Formula (1), $R^1$ represents an alkyl group having 6 to 20 carbon atoms, $R^2$ and $R^3$ each independently represent a chain hydrocarbon group having 1 to 5 carbon atoms, $L^1$ represents a single bond or a divalent linking group, $L^2$ represents a divalent linking group, and $A^-$ represents a $—SO_3^-$ group (that is, a sulfonate group) or a $—COO^-$ group (that is, a carboxylate group).

In Formula (1), the alkyl group having 6 to 20 carbon atoms represented by $R^1$ may be a linear alkyl group or a branched alkyl group.

The number of carbon atoms in the alkyl group having 6 to 20 carbon atoms represented by $R^1$ is preferably 8 to 18 and more preferably 10 to 16.

In Formula (1), $R^2$ and $R^3$ each independently represent a chain hydrocarbon group having 1 to 5 carbon atoms.

The chain hydrocarbon group having 1 to 5 carbon atoms represented by $R^2$ or $R^3$ may be substituted with a hydroxy group.

The chain hydrocarbon group having 1 to 5 carbon atoms represented by $R^2$ or $R^3$ may be any one of an alkyl group, an alkenyl group, or an alkynyl group, but an alkyl group or an alkenyl group is preferable and an alkyl group is more preferable.

The number of carbon atoms in the chain hydrocarbon group having 1 to 5 carbon atoms represented by $R^2$ or $R^3$ is preferably 1 to 3, more preferably 1 or 2, and still more preferably 1.

The chain hydrocarbon group having 1 to 5 carbon atoms represented by $R^2$ or $R^3$ is preferably a methyl group, an ethyl group, a propyl group, or a butyl group, more preferably a methyl group, an ethyl group, or a propyl group, still more preferably a methyl group or an ethyl group, and even more preferably a methyl group.

In Formula (1), $L^1$ represents a single bond or a divalent linking group.

As the divalent linking group represented by $L^1$, groups (L-1) to (L-5) shown below are preferable.

(L-1)

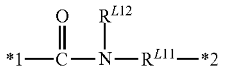

(L-2)

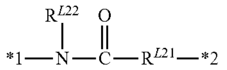

(L-3)

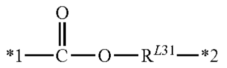

-continued (L-4)

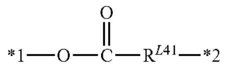

(L-5)

$*1—O—R^{L51}—*2$

In the groups (L-1) to (L-5), *1 represents a bonding position to $R^1$ in Formula (1), and *2 represents a bonding position to $N^+$ in Formula (1).

$R^{L11}$ in the group (L-1), $R^{L21}$ in the group (L-2), $R^{L31}$ in the group (L-3), $R^{L41}$ in the group (L-4), and $R^{L51}$ in the group (L-5) each independently represent an alkylene group having 1 to 6 carbon atoms, which may be substituted with a hydroxy group.

$R^{L12}$ in the group (L-1) and $R^{L22}$ in the group (L-2) each independently represent a hydrogen atom or an alkyl group having 1 to 6 carbon atoms, which may be substituted with a hydroxy group.

$R^{L11}$ in the group (L-1), $R^{L21}$ in the group (L-2), $R^{L31}$ in the group (L-3), $R^{L41}$ in the group (L-4), and $R^{L51}$ in the group (L-5) are each independently preferably an unsubstituted alkylene group having 1 to 6 carbon atoms, more preferably an unsubstituted alkylene group having 1 to 4 carbon atoms, and still more preferably an unsubstituted alkylene group having 1 to 3 carbon atoms.

$R^{L12}$ in the group (L-1) and $R^{L22}$ in the group (L-2) are each independently preferably a hydrogen atom, a methyl group, or an ethyl group, more preferably a hydrogen atom or a methyl group, and still more preferably a hydrogen atom.

In Formula (1), as $L^1$, a single bond, the group (L-1), or the group (L-2) is preferable, and a single bond or the group (L-1) is more preferable.

In Formula (1), $L^2$ represents a divalent linking group.

As the divalent linking group represented by $L^2$, an alkylene group having 1 to 6 carbon atoms, which may be substituted with a hydroxy group, is preferable, an alkylene group having 1 to 4 carbon atoms, which may be substituted with a hydroxy group, is more preferable, and an alkylene group having 1 to 3 carbon atoms, which may be substituted with a hydroxy group, is still more preferable.

In Formula (1), A' represents a $—SO_3^-$ group (that is, a sulfonate group) or $—COO^-$ group (that is, a carboxylate group).

As $A^-$, from the viewpoint that the effect of suppressing intercolor bleeding is more effectively exhibited, a $—SO_3^-$ group is preferable.

The molecular weight of the betaine compound (1) is preferably 1000 or less.

In a case where the molecular weight of the betaine compound (1) is 1000 or less, the betaine compound (1) is more easily transferred in the ink film, the effect of suppressing intercolor bleeding is more effectively exhibited.

The molecular weight of the betaine compound (1) is more preferably 800 or less and still more preferably 600 or less.

Specific examples of the betaine compound (1) include the following compounds (1-1) to (1-7), which are shown in Examples described later.

(1-1)

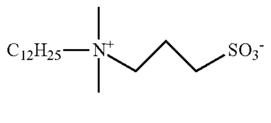

-continued (1-2)

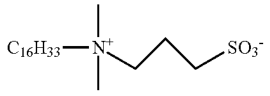

(1-3)

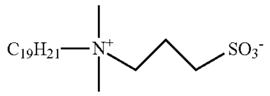

(1-4)

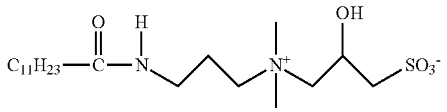

(1-5)

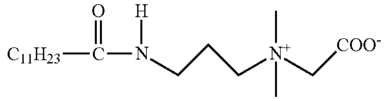

(1-6)

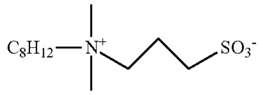

(1-7)

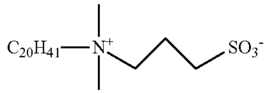

The content of the betaine compound (1) in the ink according to the embodiment of the present disclosure is preferably 0.01% by mass to 10% by mass, more preferably 0.1% by mass to 3% by mass, and still more preferably 0.1% by mass to 2% by mass with respect to the total amount of the ink.

<Resin-Coated Pigment in which at Least Part of Pigments is Coated with Cross-Linked Resin>

The ink according to the embodiment of the present disclosure includes at least one resin-coated pigment (hereinafter, also referred to as a cross-linked resin-coated pigment) in which at least a part of pigments is coated with a cross-linked resin.

The cross-linked resin-coated pigment can be formed by a method, for example, in which, by dispersing pigments using, as a dispersant, a resin (hereinafter, also referred to as an "uncross-linked resin") which is uncross-linked, an uncross-linked resin-coated pigment in which at least a part of the pigments is coated with the uncross-linked resin, and then the uncross-linked resin in the obtained uncross-linked resin-coated pigment (that is, the uncross-linked resin coating at least a part of the pigments) is cross-linked by a cross-linking agent.

(Pigment)

As the pigment in the cross-linked resin-coated pigment, organic pigments and inorganic pigments known in the field of ink can be used without particular limitation.

Examples of the pigment include polycyclic pigments such as an azolake pigment, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, and a quinophthalone pigment; organic pigments such as a nitro pigment, a nitroso pigment, aniline black, and a daylight fluorescent pigment; and inorganic pigments such as titanium oxide, iron oxide, and carbon black.

As the pigment, an azo pigment, a phthalocyanine pigment, an anthraquinone pigment, a quinacridone pigment, or a carbon black pigment is preferable.

With regard to the pigment, the description in a known reference such as JP5404669B may be appropriately referred to.

The pigment concentration in the ink according to the embodiment of the present disclosure (that is, the content of the pigment with respect to the total amount of the ink) is preferably 1% by mass to 20% by mass, more preferably 1% by mass to 15% by mass, and still more preferably 1% by mass to 10% by mass.

(Cross-Linked Resin and Uncross-Linked Resin)

The cross-linked resin in the cross-linked resin-coated pigment is formed by cross-linking the uncross-linked resin.

As the uncross-linked resin, a water-soluble resin is preferable.

That is, the cross-linked resin in the cross-linked resin-coated pigment is preferably a cross-linked water-soluble resin.

In the present disclosure, "water-soluble" in the "water-soluble resin" means that a property of being dissolved in distilled water at 25° C. in an amount of 2% by mass or more.

The water-soluble resin is preferably dissolved in distilled water at 25° C. in an amount of 5% by mass or more, and more preferably dissolved in an amount of 10% by mass or more.

It is needless to say that the uncross-linked water-soluble resin has water solubility, but the "cross-linked water-soluble resin" does not necessarily have to be water-soluble.

Examples of the uncross-linked water-soluble resin include polyvinyls, polyurethanes, and polyesters, and among these, polyvinyls are preferable.

As the uncross-linked water-soluble resin, a water-soluble resin having a functional group which can be cross-linked by a cross-linking agent is preferable.

Examples of the cross-linkable functional group include a carboxy group or a salt thereof, an isocyanate group, and an epoxy group, and from the viewpoint of improving dispersibility, a carboxy group or a salt thereof is preferable, and a carboxy group is particularly preferable.

As the water-soluble resin having a carboxy group, which is a preferred aspect of the uncross-linked water-soluble resin, a copolymer including a structural unit derived from a carboxy group-containing monomer (that is, a structural unit formed by polymerizing the carboxy group-containing monomer) is more preferable.

The structural unit derived from the carboxy group-containing monomer included in the copolymer may be used singly or two or more kinds thereof may be used.

Examples of the carboxy group-containing monomer include (meth)acrylic acid, β-carboxyethyl acrylate, fumaric acid, itaconic acid, maleic acid, and crotonic acid.

From the viewpoint of crosslinkability and dispersion stability, as the carboxy group-containing monomer, (meth)acrylic acid or β-carboxyethyl acrylate is preferable, and (meth)acrylic acid is more preferable.

Here, the (meth)acrylic acid is a concept including acrylic acid and methacrylic acid.

The copolymer including the structural unit derived from a carboxy group-containing monomer preferably further includes a structural unit derived from a hydrophobic monomer (that is, a structural unit formed by polymerizing the hydrophobic monomer).

In this case, the structural unit derived from the hydrophobic monomer included in the copolymer may be used singly or two or more kinds thereof may be used.

Examples of the hydrophobic monomer include (meth) acrylate having an alkyl group having 1 to 20 carbon atoms, (meth)acrylate having an aromatic ring group (for example, benzyl (meth)acrylate, phenoxyethyl (meth)acrylate, and the like), styrene, and styrene derivative.

The method for synthesizing the copolymer is not particularly limited, but a method in which vinyl monomers are randomly copolymerized is preferable in terms of dispersion stability.

As the water-soluble resin having a carboxy group, which is a preferred aspect of the uncross-linked resin, a copolymer including a structural unit derived from a carboxy group-containing monomer, and at least one of a structural unit derived from (meth)acrylate having an alkyl group having 1 to 20 carbon atoms or a structural unit derived from (meth)acrylate having an aromatic ring group is more preferable;

a copolymer including a structural unit derived from (meth)acrylic acid and a structural unit derived from (meth)acrylate having an aromatic ring group is still more preferable; and a copolymer including a structural unit derived from (meth)acrylic acid and a structural unit derived from benzyl (meth)acrylate is even more preferable.

From the viewpoint of dispersibility of the pigment, the acid value of the uncross-linked resin is preferably 67 mgKOH/g to 200 mgKOH/g and more preferably 67 mgKOH/g to 150 mgKOH/g.

In addition, from the viewpoint of dispersibility of the pigment, the acid value of the cross-linked resin is preferably 55 to 100 mgKOH/g.

From the viewpoint of dispersibility of the pigment, the weight-average molecular weight (Mw) of the uncross-linked resin is not particularly limited, but is preferably 3,000 to 100,000, more preferably 5,000 to 80,000, and still more preferably 10,000 to 60,000.

The preferred range of the weight-average molecular weight of the cross-linked resin is the same as the preferred range of the weight-average molecular weight of the uncross-linked resin.

In the present disclosure, the weight-average molecular weight (Mw) is measured by gel permeation chromatography (GPC). In the GPC, HLC-8220 GPC (manufactured by Tosoh Corporation) is used, three columns of TSKgel, Super HZM-H, TSKgel, Super H74000, and TSKgel. Super H7.2000 (all trade names manufactured by Tosoh Corporation) are used as columns while being connected in series, and tetrahydrofuran (THF) is used as an eluent. As the conditions, a sample concentration of 0.45% by mass, a flow rate of 0.35 ml/min, a sample injection amount of 10 μl, and a measurement temperature of 40° C. are set, and a differential refractive index detector is used. The calibration curve is created from eight samples of "Standard sample TSK standard, polystyrene" manufactured by Tosoh Corporation: "F-40", "F-20". "F-4", "F-1", "A-5000", "A-2500", "A-1000", and "n-propylbenzene".

(Cross-Linking Agent)

The cross-linked resin is preferably a resin cross-linked by a cross-linking agent.

The resin cross-linked by the cross-linking agent is formed by cross-linking the uncross-linked resin with a cross-linking agent.

In the formation of the cross-linked resin, the cross-linking agent may be used singly or two or more kinds thereof may be used.

As the cross-linking agent, a compound having two or more reaction sites with the uncross-linked resin (for example, a water-soluble resin having a carboxy group) is preferable.

A preferred combination of the cross-linking agent and the uncross-linked resin is a combination of, as the cross-linking agent, a compound having two or more epoxy groups (that is, a bi- or higher functional epoxy compound) and, as the uncross-linked resin, the above-described water-soluble resin having a carboxy group. In this combination, a cross-linking structure is formed by the reaction of the carboxy group in the water-soluble resin having a carboxy group and the epoxy group in the compound having two or more epoxy groups, and as a result, the cross-linked resin is formed. The formation of such a crosslinking structure is preferably carried out after dispersing the pigment with the water-soluble resin having a carboxy group (that is, after forming the uncross-linked resin-coated pigment).

Specific examples of the bi- or higher functional epoxy compound, which is a preferred aspect of the cross-linking agent, include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable.

As the cross-linking agent, a commercially available product can also be used. As the commercially available product, for example, Denacol EX-321, EX-821, EX-830, EX-850, and EX-851 (manufactured by Nagase ChemteX Corporation), and the like can be used.

From the viewpoint of cross-linking reaction rate and/or dispersion stability after cross-linking, the molar ratio of the cross-linking site (for example, the epoxy group) in the cross-linking agent to the cross-linked site (for example, the carboxy group) in the uncross-linked resin [cross-linking site (for example, epoxy group) in cross-linking agent:cross-linked site (for example, carboxy group) in uncross-linked resin] is preferably 1:1.1 to 1:10, more preferably 1:1.1 to 1:5, and still more preferably 1:1.1 to 1:3.

In addition, in the cross-linked resin-coated pigment, the mass ratio of the pigment with respect to the cross-linked resin (hereinafter, mass ratio [pigment/cross-linked resin]) is preferably 0.1 to 1.5 and more preferably 0.2 to 1.0.

The volume average particle diameter of the cross-linked resin-coated pigment is preferably 10 nm to 200 nm, more preferably 10 nm to 150 nm, still more preferably 40 nm to 150 nm, and even more preferably 50 nm to 150 nm.

In the present disclosure, the volume average particle diameter refers to a value obtained by a dynamic light scattering method.

The volume average particle diameter is measured, for example, using a nanotrac particle size distribution measuring apparatus UPA-EX150 (manufactured by Nikkiso Co., Ltd.).

In the ink according to the embodiment of the present disclosure, the content of the cross-linked resin-coated pigment is preferably 1.5% by mass to 25% by mass, more preferably 2% by mass to 20% by mass, and still more preferably 2% by mass to 15% by mass with respect to the total amount of the ink.

<Water>

The ink according to the embodiment of the present disclosure includes water.

The content of water in the ink according to the embodiment of the present disclosure is, for example, 40% by mass or more, preferably 50% by mass or more and more preferably 60% by mass or more with respect to the total amount of the ink.

The upper limit of the content of water depends on the amount of other components. The upper limit of the content of water is, for example, 95% by mass, preferably 90% by mass with respect to the total amount of the ink.

<Organic Solvent A>

The ink according to the embodiment of the present disclosure may further include an organic solvent A which is a compound represented by Formula (A1) or Formula (A2).

In a case where the ink according to the embodiment of the present disclosure includes the organic solvent A, the organic solvent A included in the ink according to the embodiment of the present disclosure may be used singly or two or more kinds thereof may be used.

(A1)

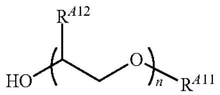

(A2)

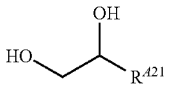

In Formula (A1), $R^{A11}$ represents a chain hydrocarbon group having 4 to 9 carbon atoms or an aryl group having 6 to 10 carbon atoms, $R^{A12}$ represents a hydrogen atom or a methyl group, and n represents an integer of 1 to 3.

In Formula (A2), $R^{A21}$ represents a chain hydrocarbon group having 4 to 9 carbon atoms or an aryl group having 6 to 10 carbon atoms.

In a case where the ink according to the embodiment of the present disclosure includes the organic solvent A, the surface tension of the ink can be further reduced. Therefore, it is advantageous in terms of improving image quality formed by the ink.

In a case where an ink which does not include the cross-linked resin-coated pigment (for example, ink which includes the uncross-linked resin-coated pigment instead of the cross-linked resin-coated pigment) further includes the organic solvent A, compared with a case where the ink including the cross-linked resin-coated pigment further includes the organic solvent A, the storage stability of the ink tends to decrease. The reason for this is that the organic solvent A has a high affinity with the uncross-linked resin (preferably, the water-soluble resin) in the uncross-linked resin-coated pigment, so that the uncross-linked resin is peeled off from the pigment in the uncross-linked resin-coated pigment. As a result, it is considered that the dispersion stability of the pigment tends to decrease.

Since the resin in the resin-coated pigment is cross-linked, the storage stability of the ink is excellent even in a case where the above-described organic solvent A is included.

Therefore, in a case where the ink according to the embodiment of the present disclosure includes the organic solvent A, the improvement width (improvement width of the storage stability) due to the cross-linking of the resin is larger.

The chain hydrocarbon group having 4 to 9 carbon atoms represented by $R^{A11}$ in Formula (A1) and the chain hydrocarbon group having 4 to 9 carbon atoms represented by $R^{A21}$ in Formula (A2) may be each independently a linear hydrocarbon group or a hydrocarbon group having a branch.

Each of the chain hydrocarbon group having 4 to 9 carbon atoms represented by $R^{A11}$ and the chain hydrocarbon group having 4 to 9 carbon atoms represented by $R^{A21}$ is preferably an alkyl group having 4 to 9 carbon atoms.

The number of carbon atoms in each of the chain hydrocarbon group having 4 to 9 carbon atoms represented by $R^{A11}$ and the chain hydrocarbon group having 4 to 9 carbon atoms represented by $R^{A21}$ is preferably 6 to 8.

Each of the aryl group having 6 to 10 carbon atoms represented by $R^{A11}$ in Formula (A1) and the aryl group having 6 to 10 carbon atoms represented by $R^{A21}$ in Formula (A2) is preferably a phenyl group or a naphthyl group and more preferably a phenyl group.

In Formula (A1), n represents an integer of 1 to 3.

From the viewpoint of further reducing the surface tension of the ink, n is preferably 1 or 2 and more preferably 1.

The Clog P value of the organic solvent A is preferably 0.5 to 3.5, more preferably 1.5 to 3.0, and still more preferably 1.7 to 3.0.

In a case where the Clog P value of the organic solvent A is 0.5 or more, the image quality of image to be formed is further improved.

In a case where the Clog P value of the organic solvent A is 3.5 or less, the storage stability of the ink is further improved.

In the present disclosure, the Clog P value is a value indicating the degree of hydrophobicity. As the Clog P value is larger, the hydrophobicity is higher.

The Clog P value in the present disclosure is calculated using ChemBioDrawUltra 13.0 (manufactured by PerkinElmer Co., Ltd.).

Among the organic solvents A, examples of the compound represented by Formula (A1) include ethylene glycol monoalkyl ethers such as ethylene glycol monobutyl ether, ethylene glycol monopentyl ether, ethylene glycol monohexyl ether, ethylene glycol monoheptyl ether, ethylene glycol monooctyl ether, ethylene glycol monononyl ether, and ethylene glycol mono-2-ethylhexyl ether; diethylene glycol monoalkyl ethers such as diethylene glycol monobutyl ether, diethylene glycol monopentyl ether, diethylene glycol monohexyl ether, diethylene glycol monoheptyl ether, diethylene glycol monooctyl ether, diethylene glycol monononyl ether, and diethylene glycol mono-2-ethylhexyl ether; triethylene glycol monoalkyl ethers such as triethylene glycol monobutyl ether, triethylene glycol monopentyl ether, triethylene glycol monohexyl ether, triethylene glycol monoheptyl ether, triethylene glycol monooctyl ether, triethylene glycol monononyl ether, and triethylene glycol mono-2-ethylhexyl ether; propylene glycol monoalkyl ethers such as propylene glycol monobutyl ether, propylene glycol monopentyl ether, propylene glycol monohexyl ether, propylene glycol monoheptyl ether, propylene glycol monooctyl ether, and propylene glycol mono-2-ethylhexyl ether; dipropylene glycol monoalkyl ethers such as dipropylene glycol monobutyl ether, dipropylene glycol monopentyl ether, dipropylene glycol monohexyl ether, dipropylene glycol monoheptyl ether, dipropylene glycol monooctyl ether, and dipropylene glycol mono-2-ethylhexyl ether; and tripropylene glycol monoalkyl ethers such as tripropylene glycol monobutyl ether, tripropylene glycol monopentyl ether, tripropylene glycol monohexyl ether, tripropylene glycol monoheptyl ether, tripropylene glycol monooctyl ether, and tripropylene glycol mono-2-ethylhexyl ether.

Among the organic solvents A, examples of the compound represented by Formula (A2) include alkanediols such as 1,2-hexanediol, 1,2-heptanediol, 1,2-octanediol, 1,2-nonanediol, and 1,2-decanediol.

As the organic solvent A, ethylene glycol monohexyl ether, diethylene glycol monohexyl ether, diethylene glycol mono-2-ethylhexyl ether, or 1,2-octanediol is preferable.

In a case where the ink according to the embodiment of the present disclosure includes the organic solvent A, the content of the organic solvent A is preferably 0.1% by mass to 15% by mass, more preferably 0.5% by mass to 10% by mass, and still more preferably 1.0% by mass to 5.0% by mass with respect to the total amount of the ink.

In a case where the content of the organic solvent A is 0.1% by mass or more, it is advantageous in terms of the image quality of image to be formed.

In a case where the content of the organic solvent A is 15% by mass or less, it is advantageous in terms of the storage stability of the ink.

In a case where the ink according to the embodiment of the present disclosure includes the organic solvent A, the ratio of the mass content of the organic solvent A with respect to the mass content of the betaine compound (1) (hereinafter, also referred to as a "mass content ratio [organic solvent A/betaine compound (1)]") is preferably 0.5 to 100, more preferably 1 to 50, and still more preferably 2 to 10.

In a case where the mass content ratio [organic solvent A/betaine compound (1)] is 0.5 or more, it is advantageous in terms of the image quality of image to be formed.

In a case where the mass content ratio [organic solvent A/betaine compound (1)] is 100 or less, it is advantageous in terms of suppressing intercolor bleeding.

<Other Organic Solvents>

The ink according to the embodiment of the present disclosure may include an organic solvent other than the organic solvent A.

From the viewpoint of drying properties of the ink, examples of other organic solvents include an organic solvent B which is an organic solvent other than the organic solvent A and has a vapor pressure of 1.0 Pa or more at 20° C.

An organic solvent corresponding to the organic solvent A is not included in the organic solvent B, even in a case where the organic solvent has a vapor pressure of 1.0 Pa or more at 20° C.

The vapor pressure of the organic solvent B at 20° C. is preferably 1.0 Pa or more, more preferably 2.0 Pa or more, and still more preferably 10 Pa or more.

The vapor pressure of the organic solvent B at 20° C. can be measured according to a known method, and for example, can be obtained by a static method. The static method is a method of directly or indirectly measuring the pressure of vapor in equilibrium with the solid of the sample, and is carried out according to OECD Guidelines 104.

The Clog P value of the organic solvent B is preferably −3.0 to 0 and more preferably-2.0 to 0.

In a case where the ink according to the embodiment of the present disclosure includes the organic solvent B, from the viewpoint of ink jettability and drying properties, the content of the organic solvent B is preferably 1% by mass to 30% by mass, more preferably 5% by mass to 25% by mass, and still more preferably 10% by mass to 20% by mass with respect to the total amount of the ink.

In addition, in a case where the ink according to the embodiment of the present disclosure includes the organic solvent A and the organic solvent B, from the viewpoint of ink jettability and drying properties, the total content of the organic solvent A and the organic solvent B is preferably 6% by mass to 40% by mass, more preferably 10% by mass to 30% by mass, and still more preferably 15% by mass to 25% by mass with respect to the total amount of the ink.

In addition, from the viewpoint of ink jettability and drying properties, the mass content ratio of the organic solvent B with respect to the organic solvent A (mass content ratio [organic solvent B/organic solvent A]) is preferably 1 to 15, more preferably 2 to 10, and still more preferably 3 to 8.

Examples of the organic solvent B include diethylene glycol (vapor pressure at 20° C.: 2.7 Pa, Clog P value: −1.30), dipropylene glycol (vapor pressure at 20° C.: 1.3 Pa, Clog P value: −0.69), propylene glycol (vapor pressure at 20° C.: 10.6 Pa, Clog P value: −1.06), and 1,2-butanediol (vapor pressure at 20° C.: 2.7 Pa, Clog P value: −0.53).

<Resin Particle>

The ink according to the embodiment of the present disclosure preferably includes resin particles.

As a result, the strength and rub resistance of image to be formed are further improved.

In the present disclosure, the resin particles are distinguished from the above-described cross-linked resin-coated pigment and uncross-linked resin-coated pigment in that the resin particles are particles formed of a resin.

Examples of the resin constituting the resin particles include an acrylic resin, a urethane resin, and a polyester resin. Among these, an acrylic resin is preferable.

Here, the acrylic resin means a polymer (homopolymer or copolymer) of a raw monomer including at least one selected from the group consisting of acrylic acid, a derivative of acrylic acid (for example, acrylic acid ester and the like), methacrylic acid, and a derivative of methacrylic acid (for example, methacrylic acid ester and the like).

From the viewpoint of dispersibility of the resin particle, the resin constituting the resin particles preferably has an anionic group.

Here, the anionic group refers to a group which forms an anion in the ink.

As the anionic group, at least one selected from the group consisting of a carboxy group, a salt of carboxy group, a sulfo group, a salt of sulfo group, a sulfate group, a salt of sulfate group, a phosphonic acid group, a salt of phosphonic acid group, a phosphoric acid group, and a salt of phosphoric acid group is more preferable, and at least one selected from the group consisting of a carboxy group and a salt of carboxy group is still more preferable.

As the above-described "salt" in the salt of carboxy group, salt of sulfo group, salt of sulfate group, salt of phosphonic acid group, and salt of phosphoric acid group, an alkali metal salt, an alkaline earth metal salt, or an organic amine salt is preferable, and an alkali metal salt is more preferable.

In a case where the resin constituting the resin particle has an anionic group, from the viewpoint of dispersibility of the resin particles, the acid value of the resin, in a case where the number of mmol of anionic groups per 1 g of the resin is taken as the acid value of the resin, is preferably 0.05 mmol/g to 0.7 mmol/g and more preferably 0.1 mmol/g to 0.4 mmol/g.

The weight-average molecular weight (Mw) of the resin constituting the resin particle is preferably 10,000 to 1,000,000 and more preferably 20,000 to 500,000.

From the viewpoint of rub resistance of image to be obtained, the glass transition temperature (Tg) of the resin constituting the resin particle is preferably 30° C. to 120° C., more preferably 50° C. to 100° C., and still more preferably 70° C. to 100° C.

As the above-described glass transition temperature (Tg), the measured Tg obtained by actual measurement is applied.

The measured Tg refers to a value measured using a differential scanning calorimeter (DSC). As the differential scanning calorimeter (DSC), for example, a differential scanning calorimeter (DSC) EXSTAR 6220 manufactured by SII Nanotechnology Co., Ltd. can be used.

However, in a case where it is difficult to measure the measured Tg due to decomposition of the material, or the like, the calculated Tg calculated by the following expression is applied. The calculated Tg is a value calculated by the following expression (F1).

$$1/Tg=\Sigma(Xi/Tgi) \quad \text{(F1)}$$

In the expression (F1), it is assumed that a polymer to be calculated is a copolymer of n kinds of monomers from i=1 to n.

In the expression (F1), Xi is a mass fraction (ΣXi-1) of the i-th monomer, and Tgi is a glass transition temperature (absolute temperature) of the homopolymer of the i-th monomer. However. Σ is the sum of i=1 to n.

As the value (Tgi) of the glass transition temperature of the homopolymer of each monomer, the value of Polymer Homopolymer (3rd Edition) (J. Brandrup, E. H. Immergut (Wiley-Interscience, 1989)) is adopted.

From the viewpoint of dispersion stability of the resin particles, the volume average particle diameter of the resin particles is preferably 1 nm to 200 nm, more preferably 5 nm to 100 nm, and still more preferably 10 nm to 50 nm.

In a case where the ink according to the embodiment of the present disclosure includes the resin particle, from the viewpoint of storage stability of the ink and rub resistance of image to be obtained, the content of the resin particles is preferably 1% by mass to 20% by mass, more preferably 1% by mass to 10% by mass, and still more preferably 2% by mass to 10% by mass with respect to the total amount of the ink.

(Resin Particle P)

In a case where the ink according to the embodiment of the present disclosure includes the resin particle, it is preferable to include a resin particle P consisting of a resin including a structural unit p-1 (hereinafter, also referred to as an "unit p-1") represented by Formula (p-1).

The resin constituting the resin particle P may contain only one kind of the unit p-1 or may contain two or more kinds thereof.

(Structural Unit p-1)

(p-1)

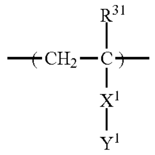

In Formula (p-1), $R^{31}$ represents a hydrogen atom or an alkyl group having 1 to 4 carbon atoms, $X^1$ represents a divalent linking group, $Y^1$ represents an anionic group, and an atom in $X^1$ and $Y^1$, which is farthest from a main chain, is a 4th atom to a 27th atom away from the main chain.

In Formula (p-1), $R^{31}$ is preferably a hydrogen atom or a methyl group.

In Formula (p-1), the divalent linking group represented by $X^1$ is preferably —C(═O)O—, —C(═O)NR$^{34}$—, an alkylene group, an arylene group, or a group represented by a bonding of these groups, and more preferably —C(═O)O—, —C(═O)NR$^{34}$—, an alkylene group having 6 to 22 carbon atoms, an arylene group having 6 to 20 carbon atoms, or a group represented by a bonding of these groups. $R^{34}$ represents a hydrogen atom or an alkyl group having 1 to 4 carbon atoms, and is preferably a hydrogen atom or a methyl group and more preferably a hydrogen atom.

In a case where $X^1$ is —C(═O)O— or —C(═O)NR$^{34}$—, it is preferable that the carbon atom bonded to $R^{31}$ in Formula (p-1) is directly bonded to the carbon atom in —C(═O)O— or —C(═O)NR$^{34}$— (excluding the carbon atom included in $R^{34}$).

In Formula (p-1), $Y^1$ is preferably —C(═O)OM, —S(═O)$_2$OM, or —OP(═O)(OM)$_2$, and more preferably —C(═O)OM.

Here, M represents a proton, an alkali metal ion, or an ammonium ion. M may be bonded or dissociated to O.

In Formula (p-1), an atom in $X^1$ and $Y^1$, which is farthest from a main chain, is a 4th atom to a 27th atom away from the main chain.

In the present disclosure, it is confirmed as follows whether or not the condition that the "atom in $X^1$ and $Y^1$, which is farthest from a main chain, is a 4th atom to a 27th atom away from the main chain" is satisfied.

In a case where the main chain (that is, the carbon atom) in Formula (p-1) is set as the 0th atom and the atom directly bonded to this main chain (without interposing other atoms) is set as the 1st atom, for each atom in $X^1$ and $Y^1$, the number of atoms from the main chain is counted along the bond extending from the main chain. In this case, in a case where there are a plurality of routes, the shortest route is adopted. In this way, for all the atoms in $X^1$ and $Y^1$, the number of atoms from the main chain (hereinafter, referred to as nth) is examined, and among the atoms in $X^1$ and $Y^1$, the atom having the largest n is defined as the atom farthest from the main chain. A case where n in the atom farthest from the main chain is 4 to 27 is the condition that the "atom in $X^1$ and $Y^1$, which is farthest from a main chain, is a 4th atom to a 27th atom away from the main chain" is satisfied.

In Formula (p-1), an atom in $X^1$ and $Y^1$, which is farthest from the main chain, is preferably a 10th atom to a 23th atom away from the main chain, and more preferably a 12th atom to a 20th atom away from the main chain.

In Formula (p-1), as the divalent linking group represented by $X^1$, a group ($X^1$-1) or a group ($X^1$-2) shown below is particularly preferable.

(X1-1)

$$*1—A^{x1}—L^{x1}—*2$$

(X1-2)

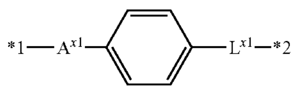

In the group ($X^1$-1) or the group ($X^1$-2), *1 represents a bonding position to the main chain (carbon atom) in Formula (p-1), and *2 represents a bonding position to $Y^1$ in Formula (p-1).

In the group (X-1) of the group ($X^1$-2), $A^{X1}$ represents a single bond, —C(═O)O—, or —C(═O)NR$^{34}$—, where $R^{34}$ represents a hydrogen atom or an alkyl group having 1 to 4 carbon atoms (preferably, a hydrogen atom or methyl group, and more preferably a hydrogen atom).

In the group (X-1) of the group ($X^1$-2), $L^{X1}$ represents a divalent linking group having 6 to 22 carbon atoms.

In the group ($X^1$-1), as $L^{X1}$, an alkylene group having 6 to 22 (more preferably 8 to 22 carbon atoms, still more preferably 8 to 16, and even more preferably 10 to 22) carbon atoms is preferable.

As the alkylene group represented $L^{X1}$ in the group ($X^1$-1), from the viewpoint of stability of the resin particle P, a linear alkylene group is preferable.

In the group ($X^1$-2), as $L^{X1}$, a divalent linking group having 6 to 20 carbon atoms is preferable, $—C(═O)NR^{35}—(CH_2)_n—$ or $—C(═O)O—(CH_2)_n—$ is more preferable, and $—C(═O)NR^{35}—(CH_2)_n—$ is still more preferable. Here, $R^{35}$ represents a hydrogen atom or an alkyl group having 1 to 4 carbon atoms, and is preferably a hydrogen atom. In addition, n is an integer of 5 to 18, more preferably 7 to 15 and still more preferably 10 to 12.

Preferred specific examples of the unit p-1 are shown below, but the unit p-1 is not limited thereto.

In the specific examples, n represents repetition number, and R represents a hydrogen atom or an alkyl group having 1 to 4 carbon atoms (preferably, a hydrogen atom or a methyl group).

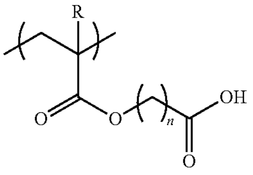

n= 6~22

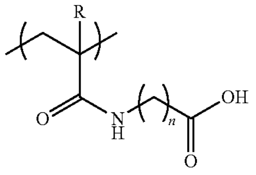

n= 6~22

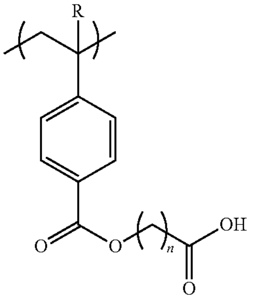

n= 5~18

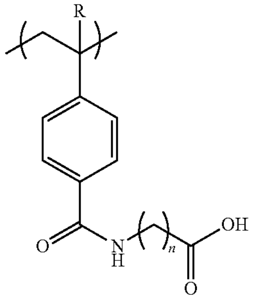

n= 5~18

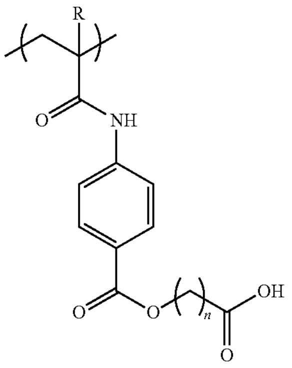

n= 5~16

-continued

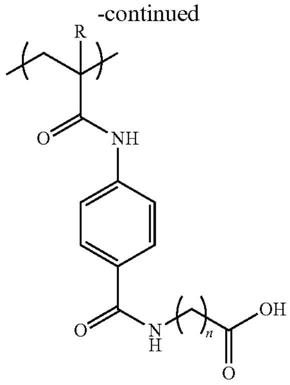

n= 5~16

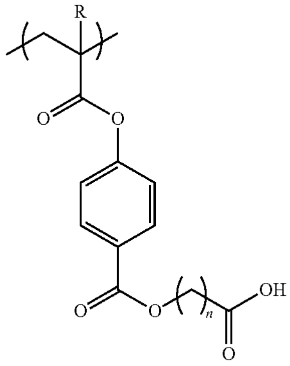

n= 5~16

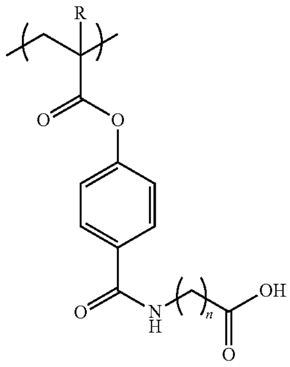

n= 5~16

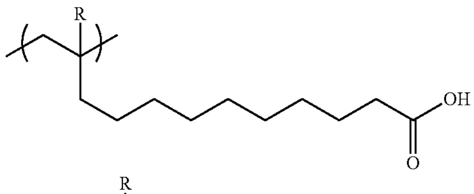

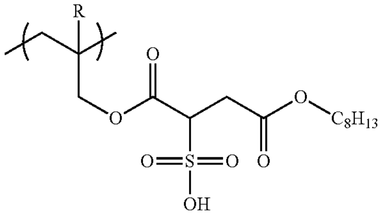

It is preferable that the Clog P value of the unit p-1 (that is, the structural unit p-1 represented by Formula (p-1)) is larger than the Clog P value of the organic solvent A.

As a result, the storage stability of the ink is further improved.

Here, the clog P value of the unit p-1 is calculated using ChemBioDrawUltra 13.0 as a Clog P value of the structure in the polymer.

In the above-described calculation, the counterion of the anionic group is calculated as $H^+$.

From the viewpoint of ink jettability and storage stability, the difference between the Clog P value of the organic solvent A and the Clog P value of the unit p-1 ((Clog P value of organic solvent A)−(Clog P value of unit p-1)) is preferably 0.2 or more, more preferably 0.8 or more, and still more preferably 1.5 or more.

In a case where the ink according to the embodiment of the present disclosure includes the resin particle P, from the viewpoint of further improving the storage stability of the ink, the content of the unit p-1 in the resin constituting the resin particle P is preferably 1% by mass to 20% by mass, more preferably 1.5% by mass to 18% by mass, and still more preferably 2% by mass to 12% by mass with respect to the total amount of the resin constituting the resin particle P.

In addition, in a case where the ink according to the embodiment of the present disclosure includes the resin particle P, from the viewpoint of further improving the storage stability of the ink, the ratio of the mass content of the unit p-1 with respect to the mass content of the betaine compound (1) (hereinafter, also referred to as a "mass content ratio [unit p-1/betaine compound (1)]" or a "mass content ratio [p-1/(1)]") is preferably 0.05 to 6.00, more preferably 0.10 to 5.00, and still more preferably 0.20 to 4.00.

(Structural Unit p-2)

It is preferable that the resin constituting the resin particle P further includes at least one structural unit p-2 (hereinafter, also referred to as an "unit p-2") derived from an ethylenically unsaturated compound having an aromatic ring structure or an alicyclic structure.

Examples of the aromatic ring structure or alicyclic structure included in the unit p-2 include a benzene ring, a naphthalene ring, an anthracene ring, and an aliphatic hydrocarbon ring having 5 to 20 carbon atoms, and a benzene ring or an aliphatic hydrocarbon ring having 6 to 10 carbon atoms is preferable.

These aromatic ring structures or alicyclic structures may have a substituent on the ring structure.

As the ethylenically unsaturated compound having an aromatic ring structure or an alicyclic structure, which is a monomer for forming the unit p-2, an ethylenically unsaturated compound having an ethylenically unsaturated group at the terminal of the compound is preferable, a styrene, a (meth)acrylate compound, or a (meth)acrylamide compound, which may have a substituent, is more preferable, and a styrene or a (meth)acrylate compound, which may have a substituent, is still more preferable.

Examples of the ethylenically unsaturated compound having an aromatic ring structure or an alicyclic structure include styrene, benzyl (meth)acrylate, isobornyl (meth)acrylate, cyclohexyl (meth)acrylate, and dicyclopentanyl (meth)acrylate.

In a case where the resin constituting the resin particle P include the unit p-2, from the viewpoint of ink jettability, the content of the unit p-2 is preferably 5% by mass to 90% by mass and more preferably 10% by mass to 50% by mass with respect to the total amount of the resin constituting the resin particle P.

(Structural Unit p-3)

From the viewpoint of further improving rub resistance of image to be obtained, the resin constituting the resin particle P may further include a structural unit p-3 (hereinafter, also referred to as an "unit p-3") represented by any one of Formula A, Formula B, Formula C, Formula D, or Formula E.

As the unit p-3, from the viewpoint of further improving ink jettability, the structural unit represented by Formula A is preferable.

Formula A

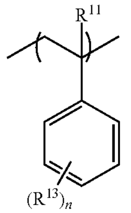

Formula B

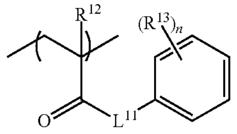

Formula C

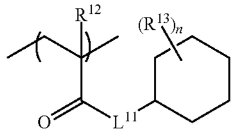

Formula D

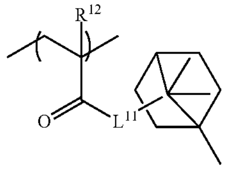

Formula E

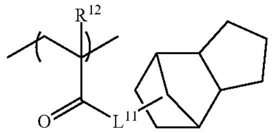

In Formulae A to E, $R^{11}$ and $R^{12}$ each independently represent a methyl group or a hydrogen atom, $R^{13}$'s each independently represent an alkyl group having 1 to 10 carbon atoms, n represents an integer of 0 to 5, and $L^{11}$ represents a single bond or a divalent linking group of an alkylene group having 1 to 18 carbon atoms, an arylene group having 6 to 18 carbon atoms, —O—, —NH—, —S—, —C(═O)—, and a group formed by linking two or more these groups.

In Formula A, $R^{11}$ is preferably a hydrogen atom.

In Formulae B to E, $R^{12}$ is preferably a methyl group.

In Formulae A to C, $R^{13}$'s are each independently preferably an alkyl group having 1 to 4 carbon atoms and more preferably a methyl group or an ethyl group.

In Formulae A to C, n is preferably an integer of 0 to 2, more preferably 0 or 1, and still more preferably 0.

In Formula B, $L^{11}$ is preferably a divalent linking group including —O— which bonds to the carbonyl group shown in Formula B or —NH— which bonds to the above carbonyl group, more preferably a divalent linking group including the above —O— or the above —NH—, and an alkylene group having 1 to 18 carbon atoms, still more preferably $—OCH_2—$ or $—NHCH_2—$, and particularly preferably $—OCH_2—$.

In Formulae C to E, $L^{11}$ is preferably a divalent linking group including —O— which bonds to the carbonyl group shown in Formulae C to E or —NH— which bonds to the above carbonyl group, more preferably —O— or —NH—, and still more preferably —O—.

In a case where the unit p-3 is the structural unit represented by Formula A, the unit p-3 is preferably a structural unit derived from styrene.

In a case where the unit p-3 is the structural unit represented by Formula B, the unit p-3 is preferably a structural unit derived from benzyl (meth)acrylate.

In a case where the unit p-3 is the structural unit represented by Formula C, the unit p-3 is preferably a structural unit derived from cyclohexyl (meth)acrylate.

In a case where the unit p-3 is the structural unit represented by Formula D, the unit p-3 is preferably a structural unit derived from isobornyl (meth)acrylate.

In a case where the unit p-3 is the structural unit represented by Formula E, the unit p-3 is preferably a structural unit derived from dicyclopentanyl (meth)acrylate.

In a case where the resin constituting the resin particle P include the unit p-3, from the viewpoint of further improving rub resistance of image, the content of the unit p-3 is preferably 1% by mass to 20% by mass with respect to the total amount of the resin constituting the resin particle P.

From the viewpoint of further improving ink jettability, the content of the unit p-3 is preferably 5% by mass to 90% by mass and more preferably 10% by mass to 50% by mass with respect to the total amount of the resin constituting the resin particle P.

(Other Structural Units (Structural Unit p-4))

The resin constituting the resin particle P may include a structural unit p-4 (hereinafter, also referred to as an "unit p-4") which is a structural unit other than the above-described units p-1 to p-3.

As the unit p-4, a structural unit derived from a (meth) acrylamide compound or a (meth)acrylate compound is preferable, and a structural unit derived from a (meth) acrylate compound is more preferable.

In addition, the unit p-4 preferably does not include an anionic group.

The monomer unit p-4 is preferably an alkyl (meth) acrylate compound in which the number of carbon atoms in the alkyl group is 1 to 10.

From the viewpoint of jettability and rub resistance, the content of the unit p-4 in the resin constituting the resin particle P is preferably 0% by mass to 90% by mass and more preferably 0% by mass to 70% by mass with respect to the total amount of the resin constituting the resin particle P.

(Specific Example of Resin Constituting Resin Particle P)

Specific examples of the resin constituting the resin particle P are shown below, but the resin constituting the resin particle P is not limited to these specific examples.

In the specific examples, n represents repetition number, the description of % by mass represents % by mass content of each structural unit, and the numerical value in the column of Mw represents a weight-average molecular weight.

| | Unit p-1 | Unit p-2 | Unit p-3 | Mw($\times 10^4$) | Tg (° C.) |
|---|---|---|---|---|---|
| P1 | 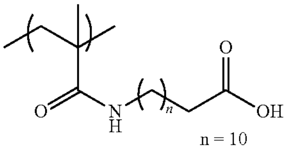 n = 10 7% by mass | 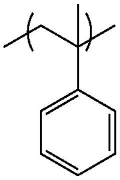 30% by mass | 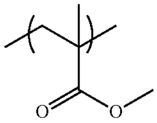 63% by mass | 25 | 96 |
| P2 | 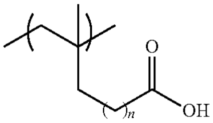 n = 7 7% by mass | 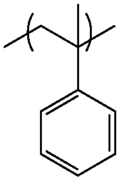 30% by mass | 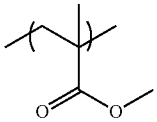 63% by mass | 26 | 94 |
| P3 | 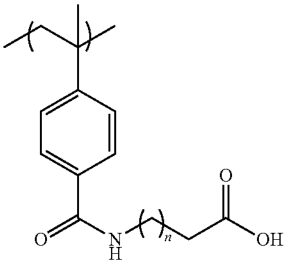 7% by mass n = 9 | 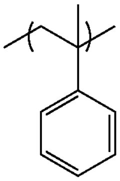 30% by mass | 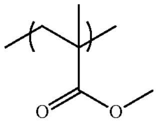 63% by mass | 28 | 96 |

-continued
| | Unit p-1 | Unit p-2 | Unit p-3 | Mw($\times 10^4$) | Tg (° C.) |
|---|---|---|---|---|---|
| P4 | 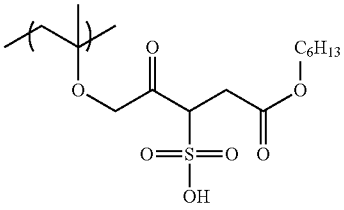<br>7% by mass | 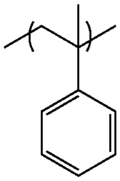<br>30% by mass | 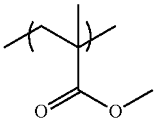<br>63% by mass | 22 | 95 |
| P5 | 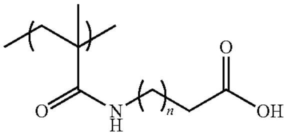<br>1% by mass<br>$n = 10$ | 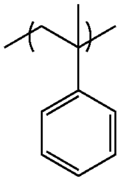<br>30% by mass | 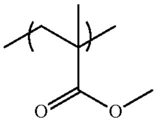<br>69% by mass | 27 | 103 |
| P6 | 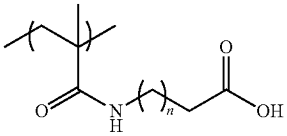<br>3% by mass<br>$n = 10$ | 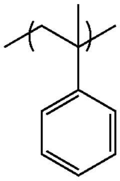<br>30% by mass | 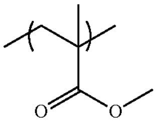<br>67% by mass | 22 | 101 |
| P7 | 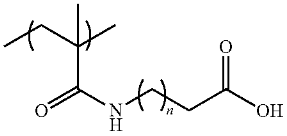<br>10% by mass<br>$n = 10$ | 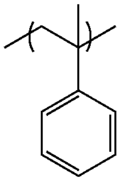<br>30% by mass | 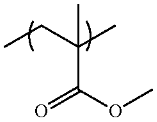<br>60% by mass | 21 | 94 |
| P8 | 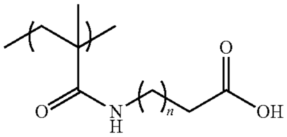<br>15% by mass<br>$n = 10$ | 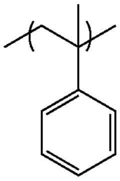<br>30% by mass | 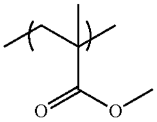<br>55% by mass | 24 | 89 |
| P9 | 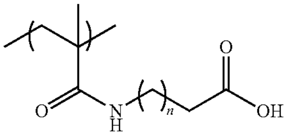<br>20% by mass<br>$n = 10$ | 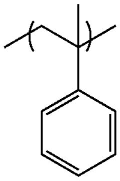<br>30% by mass | 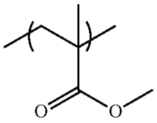<br>50% by mass | 28 | 84 |

-continued
| | Unit p-1 | Unit p-2 | Unit p-3 | Mw(×10$^4$) | Tg (° C.) |
|---|---|---|---|---|---|
| P10 | 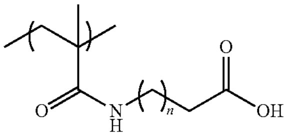 7% by mass<br>*n* = 10 | 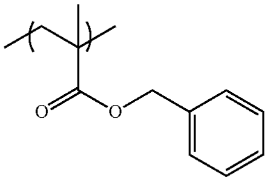 30% by mass | 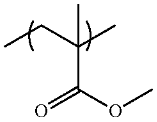 63% by mass | 30 | 83 |
| P11 | 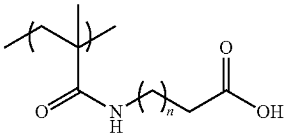 7% by mass<br>*n* = 10 | 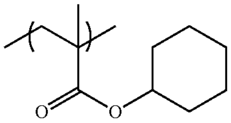 30% by mass | 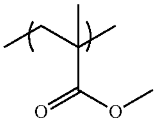 63% by mass | 22 | 78 |
| P12 | 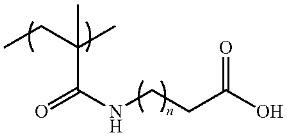 7% by mass<br>*n* = 10 | 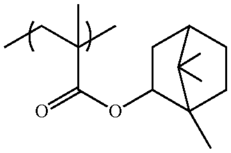 30% by mass | 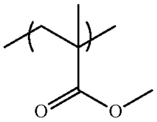 63% by mass | 25 | 115 |
| P13 | 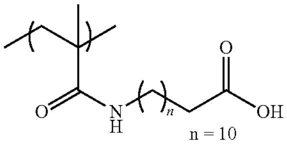 n = 10<br>7% by mass | 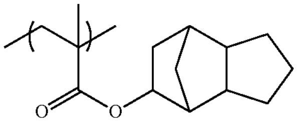 30% by mass | 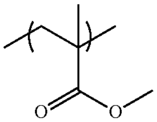 63% by mass | 20 | 118 |
| P14 | 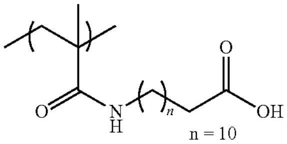 n = 10<br>7% by mass | 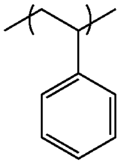 5% by mass | 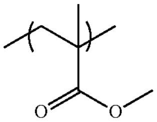 88% by mass | 28 | 98 |
| P15 | 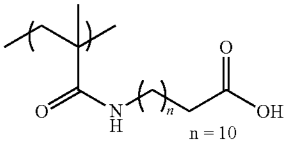 n = 10<br>7% by mass | 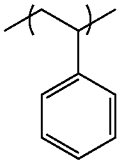 10% by mass | 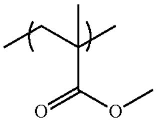 83% by mass | 20 | 98 |
| P16 | 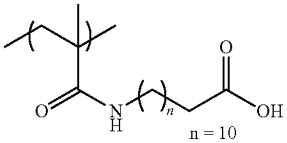 n = 10<br>7% by mass | 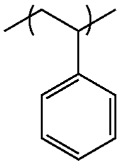 50% by mass | 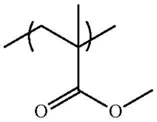 43% by mass | 15 | 95 |

-continued

| | Unit p-1 | Unit p-2 | Unit p-3 | Mw(×10$^4$) | Tg (° C.) |
|---|---|---|---|---|---|
| P17 | 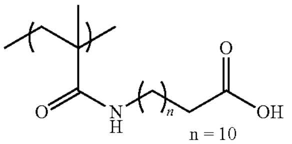 n = 10 7% by mass | 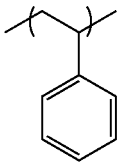 90% by mass | 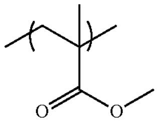 3% by mass | 18 | 93 |
| P18 | 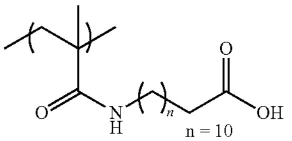 n = 10 7% by mass | 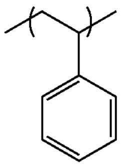 30% by mass | 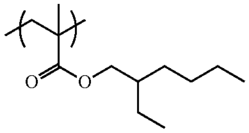 63% by mass | 23 | 24 |
| P19 | 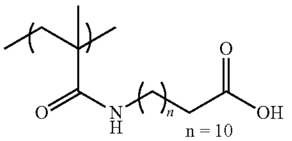 n = 10 7% by mass | 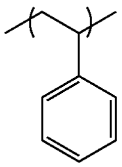 46% by mass | 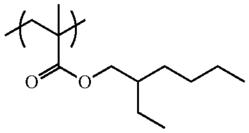 47% by mass | 25 | 42 |
| P20 | 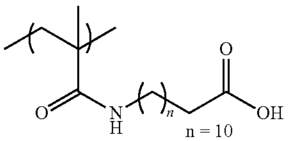 n = 10 7% by mass | 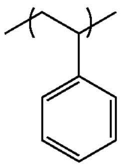 63% by mass | 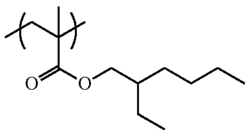 30% by mass | 28 | 60 |
| P21 | 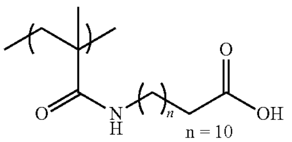 n = 10 7% by mass | 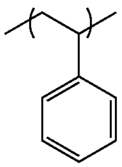 30% by mass | 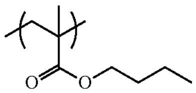 63% by mass | 15 | −4 |
| P22 | 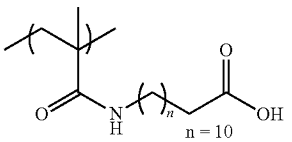 n = 10 15% by mass | 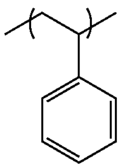 85% by mass | — | 23 | 86 |

The preferred physical properties (for example. Mw, 1 g, and volume average particle diameter) of the resin particle P are the same as those of the resin particle described above.

In a case where the ink according to the embodiment of the present disclosure includes the resin particle P, from the viewpoint of storage stability of the ink and rub resistance of image to be obtained, the content of the resin particle P is preferably 1% by mass to 20% by mass, more preferably 1% by mass to 10% by mass, and still more preferably 2% by mass to 10% by mass with respect to the total amount of the ink.

In addition, in a case where the ink according to the embodiment of the present disclosure includes the resin particle P, from the viewpoint of more effectively exhibiting the effect of the resin particle P (specifically, the effect of improving storage stability of the ink), the proportion of the resin particle P in all the resin particles included in the ink is preferably 50% by mass or more, more preferably 60% by mass or more, and still more preferably 80% by mass or more. The resin particle (for example, the resin particle P) can be produced by a known method.

With regard to the production method, a known reference such as WO2018/062212 may be appropriately referred to.

The resin particle (for example, the resin particle P) is preferably a self-dispersing resin particle.

Here, the self-dispersing resin particle means a resin particle formed of a water-insoluble resin, in which, in a case of being dispersed by a phase-transfer emulsification method in the absence of a surfactant, the self-dispersing resin particle can be dispersed in an aqueous medium due to the functional group (particularly, a hydrophilic group such as an acidic group and a salt thereof) of the resin itself.

Here, the dispersed state includes both an emulsified state (emulsion) in which the water-insoluble resin is dispersed in the aqueous medium in a liquid state and a dispersed state (suspension) in which the water-insoluble resin is dispersed in the aqueous medium in a solid state.

In addition, the "water-insoluble" means that the amount dissolved in 100 parts by mass of water at 25° C. is 5.0 parts by mass or less.

The resin particle does not function as a dispersant for the pigment, and therefore does not include the pigment inside the particle.

<Other Components>

The ink according to the embodiment of the present disclosure may include a component other than the above-described components.

Examples of other components which may be included in the ink according to the embodiment of the present disclosure include a surfactant, an ultraviolet absorber, an anti-fading agent, an antibacterial agent, a pH adjuster, a rust inhibitor, an antioxidant, an emulsification stabilizer, a preservative, an antifoaming agent, a viscosity adjuster, a dispersion stabilizer, a chelating agent, and a solid wetting agent, in addition to the above-described betaine compound (1).

With regard to the other components which may be included in the ink according to the embodiment of the present disclosure, a known reference such as WO2018/062212 may be appropriately referred to.

<Preferred Physical Properties of Ink>

[Viscosity]

The viscosity of the ink according to the embodiment of the present disclosure at 30° C. is preferably 1.2 mPa·s to 15.0 mPa·s, more preferably 2.0 mPa·s to 13.0 mPa·s, and still more preferably 2.5 mPa·s to 10.0 mPa·s.

Here, the viscosity of the ink refers to a value measured using a viscometer. As the viscometer, for example, VISCOMETER TV-22 (manufactured by TOKI SANGYO CO., LTD.) is used.

[pH]

From the viewpoint of storage stability of the ink, the pH of the ink according to the embodiment of the present disclosure at 25° C. is preferably 6.0 to 11.0, more preferably 7.0 to 10.0, and still more preferably 7.0 to 9.0.

Here, the pH of the ink refers to a value measured using a pH meter.

As the pH meter, for example, WM-50EG (manufactured by DKK-TOA CORPORATION) is used.

[Ink Set]

The ink set according to the embodiment of the present disclosure includes two or more kinds of inks, in which at least one of the two or more kinds of inks is the ink according to the embodiment of the present disclosure.

The ink set according to the embodiment of the present disclosure may consist of two or more kinds (for example, two or more colors) of the inks according to the embodiment of the present disclosure, or may include one or more kinds (for example, one or more colors) of the ink according to the embodiment of the present disclosure and one or more kinds (for example, one or more colors) of ink other than the ink according to the embodiment of the present disclosure.

The ink set according to the embodiment of the present disclosure is suitable for image formation of an aspect in which the second ink is applied in layers to the ink film formed of the first ink which is the ink according to the embodiment of the present disclosure. The second ink may be the ink according to the embodiment of the present disclosure, or may be a water-based ink other than the ink according to the embodiment of the present disclosure.

By performing the image formation of the above-described aspect using the ink set according to the embodiment of the present disclosure, it is possible to form an image in which intercolor bleeding is suppressed.

In addition, in the ink according to the embodiment of the present disclosure in the ink set according to the embodiment of the present disclosure, although the ink includes the resin-coated pigment and the betaine compound (1), the decrease in storage stability of the ink due to the betaine compound (1) is suppressed.

In the ink set according to the embodiment of the present disclosure, it is preferable that at least two of the two or more kinds of inks are the inks according to the embodiment of the present disclosure.

In this case, the ink set according to the embodiment of the present disclosure is suitable for image formation of an aspect in which the second ink, which is the ink according to the embodiment of the present disclosure, is applied in layers to the ink film formed of the first ink which is the ink according to the embodiment of the present disclosure. According to the image formation of this aspect, the effect of suppressing intercolor bleeding is more effectively exhibited.

Examples of the ink set according to the embodiment of the present disclosure include an aspect of an ink set including black ink, yellow ink, magenta ink, and cyan ink, in which at least one (preferably, at least two) ink in the ink set is the ink according to the embodiment of the present disclosure.

[Image Forming Method]

The image forming method according to the embodiment of the present disclosure includes a step (hereinafter, also referred to as a "first ink applying step") of applying a first ink, which is the ink according to the embodiment of the present disclosure, to a recording medium, and a step (hereinafter, also referred to as a "second ink applying step") of applying a second ink, which contains a coloring material and water and has a hue different from a hue of the first ink, to the first ink applied to the recording medium.

In the image forming method according to the embodiment of the present disclosure, as described above, the second ink is applied to the first ink which has been applied to the recording medium. Therefore, for the reason described above, it is possible to form a polychromic image in which intercolor bleeding is suppressed.

In addition, in the first ink, although the ink includes the resin-coated pigment and the betaine compound (1), the decrease in storage stability of the ink due to the betaine compound (1) is suppressed.

In the image forming method according to the embodiment of the present disclosure, the first ink and the second ink may be used singly or two or more kinds thereof may be used, respectively.

For example, in a case where the first ink is used singly and the second ink is used singly, it is possible to form a two-color image in which intercolor bleeding is suppressed.

In addition, in a case where the first ink is used singly and two kinds of the second ink are used, it is possible to form a three-color image in which intercolor bleeding is suppressed.

In addition, the second ink may be the ink according to the embodiment of the present disclosure, or may be a water-based ink other than the ink according to the embodiment of the present disclosure. From the viewpoint of more effectively exhibiting the effect of suppressing intercolor bleeding, the second ink is preferably the ink according to the embodiment of the present disclosure.

<Recording Medium>

The recording medium used in the image forming method according to the embodiment of the present disclosure is not particularly limited, and for example, so-called coated paper used for general offset printing or the like can be used.

The coated paper is formed by applying a coating material to a surface of high-quality paper or alkaline paper, which is mainly formed of cellulose and is not generally surface-treated, to provide a coating layer.

As the coated paper, those that are generally on the market can be obtained and used.

As the coated paper, for example, a coated paper for general printing can be used, and specific examples thereof include coated paper (A2, B2) such as "OK TOPCOAT+" manufactured by Oji Paper Co., Ltd., and "Aurora Coat" and "Ulite" manufactured by NIPPON PAPER INDUSTRIES CO., LTD., and art paper (A1) such as "Tokubishi Art" manufactured by MITSUBISHI PAPER MILLS LIMITED.

As the recording medium, a low water absorption recording medium or a non-water absorption recording medium can also be used.

In the present disclosure, the low water absorption recording medium refers to a recording medium having a water absorption coefficient Ka of 0.05 $mL/m^2 \cdot ms^{1/2}$ to 0.5 $mL/m^2 \cdot ms^{1/2}$, preferably 0.1 $mL/m^2 \cdot ms^{1/2}$ to 0.4 $mL/m^2 \cdot ms^{1/2}$ and more preferably 0.2 $mL/m^2 \cdot ms^{1/2}$ to 0.3 $mL/m^2 \cdot ms^{1/2}$.

In addition, the non-water absorption recording medium refers to a recording medium having a water absorption coefficient Ka of less than 0.05 $mL/m^2 \cdot ms^{1/2}$.

The water absorption coefficient Ka is synonymous with one described in JAPAN TAPPI Pulp and Paper Test Method No. 51:2000 (published by Pulp and Paper Technology Association). Specifically, the absorption coefficient Ka is calculated from the difference in amount of water transfer between the contact time of 100 ms and the contact time of 900 ms, using an automatic scanning absorptometer KM500Win (manufactured by KUMAGAI RIKI KOGYO Co., Ltd.).

As the non-absorbent recording medium, a resin substrate is preferable.

Examples of the resin substrate include a substrate obtained by molding a thermoplastic resin into a sheet shape.

The above-described resin substrate preferably includes polypropylene, polyethylene terephthalate, nylon, polyethylene, or polyimide.

The resin substrate may be a transparent resin substrate, a colored resin substrate, or a resin substrate which has been subjected to metal vapor deposition treatment or the like in at least a part thereof.

The shape of the resin substrate is not particularly limited, but a sheet-shaped resin substrate is preferable.

From the viewpoint of productivity in the image forming method, a sheet-shaped resin substrate wound in a roll shape may be used.

<First Ink Applying Step>

The first ink applying step is a step of applying the first ink, which is the ink according to the embodiment of the present disclosure, to the recording medium.

In the first ink applying step, in a case where the first ink is directly applied to the recording medium, the effect of suppressing intercolor bleeding due to the ink according to the embodiment of the present disclosure is more effectively exhibited. This point will be supplemented below.

In the field of image formation using aqueous ink, the recording medium may be pretreated in advance before applying the ink. 'The above-described pretreatment is a treatment of applying a treatment liquid including a coagulating agent (for example, an organic acid, a polyvalent metal salt, a cationic polymer, and the like) which coagulates the components in the ink to the recording medium. Examples of the treatment liquid include the reaction solution in JP2014-111374A.

Unlike the image formation in this aspect, in image formation in which the first ink is directly applied to the recording medium which has not been pretreated (that is, a treatment liquid including a coagulating agent which coagulates the components in the ink is not applied), generally, intercolor bleeding tends to occur more easily.

However, in the case of the image forming method according to the embodiment of the present disclosure, since the first ink includes the betaine compound (1), even in the image formation in which the first ink is directly applied to the recording medium which has been pretreated, the effect of suppressing intercolor bleeding can be obtained. That is, in the first ink applying step, in a case where the first ink is directly applied to the recording medium which has not been pretreated, the effect of suppressing intercolor bleeding due to the ink according to the embodiment of the present disclosure is more effectively exhibited.

The application of the first ink in the first ink applying step is preferably performed by an ink jet method.

As the ink jet method, a known method of ejecting ink from an ink jet head can be applied without particular limitation.

Examples of a preferred ink jet method include a method described in paragraphs 0093 to 0105 of JP2003-306623A, but the ink jet method is not limited to this example.

An ink ejection method by the ink jet method is not particularly limited, and a known method can be applied.

Examples of the ink ejection method by the ink jet method include an electric charge control method of ejecting ink by using an electrostatic attraction force; a drop-on-demand method (pressure pulse method) of using a vibration pressure of a piezo element; an acoustic ink jet method of converting an electric signal into an acoustic beam, irradiating ink, and ejecting the ink using a radiation pressure; and a thermal ink jet (Bubble jet (registered trademark)) method of heating ink to form air bubbles and utilizing the generated pressure.

In addition, examples of the ink ejection method by the ink jet method also include a method in which an ink subjected to action of thermal energy undergoes a rapid volume change by the method described in JP1979-59936A (JP-S54-59936A), and the ink is ejected from a nozzle by the acting force due to this state change.

Examples of the ink jet head used in the ink jet method include a shuttle method using a short serial head, in which recording is performed while scanning the head in the width direction of the recording medium; and a line method using a line head, in which recording elements are arranged corresponding to the entire area of one side of the recording medium.

In the line method, the image can be recorded on the entire surface of the recording medium by scanning the recording medium in the direction intersecting the arrangement direction of the recording elements, and a transport system such as a carriage which scans the short head is unnecessary.

In addition, in the line method, complicated scanning control between the movement of the carriage and the recording medium is unnecessary, and only the recording medium moves, so that the recording speed can be increased as compared with the shuttle method.

In the image forming method according to the embodiment of the present disclosure, any one of these methods can be applied, but in a case of applying the line method in which a dummy jet is generally not performed, the effect of improving ejection accuracy and image rub resistance is large.

From the viewpoint of obtaining a high-definition image, the amount of ink ejected from the ink jet head is preferably 1 pL (picoliter) to 10 pL and more preferably 1.5 pL to 6 pL. In addition, from the viewpoint of improving image unevenness and continuous gradation connection, it is also effective to combine different amounts ejected.

The first ink applying step may include heating and drying the first ink which has been applied to the recording medium, as necessary.

The first ink applying step may include heating and fixing the first ink which has been applied to the recording medium, as necessary.

Known methods and conditions can be appropriately applied to the heat-drying and heat-fixing.

<Second Ink Applying Step>

The second ink applying step is a step of applying a second ink, which contains a coloring material and water and has a hue different from a hue of the first ink, to the first ink applied to the recording medium.

The second ink applying step is the same as the first ink applying step, except that the second ink is applied to the first ink applied to the recording medium, and the preferred aspect thereof is also the same.

<Other Steps>

The image forming method according to the embodiment of the present disclosure may include a step other than the above-described steps, as necessary. Examples of other steps include a step of thermally fixing the polychromic image obtained by the first ink applying step and the second ink applying step.

EXAMPLES

Hereinafter, examples of the present disclosure will be shown, but the present disclosure is not limited to the following examples.

In the following examples, “parts” and “%” indicating amounts mean parts by mass and % by mass, respectively, unless otherwise specified.

Example 1

<Preparation of Aqueous Dispersion of Resin Particle P1>

Water (250 g), 12-methacrylamide dodecanoic acid (7.0 g), potassium bicarbonate (0.17 g), and isopropanol (20 g) were charged into a three-neck flask equipped with a stirrer, a thermometer, a reflux condenser, and a nitrogen gas introduction pipe, and the temperature was increased to 85° C. under a nitrogen stream. A mixed solution of V-501 (radical polymerization initiator, manufactured by FUJIFILM Wako Pure Chemical Corporation) (0.11 g), potassium bicarbonate (0.08 g), and water (9 g) was added thereto, and the mixture was stirred for 10 minutes. Next, a monomer solution of styrene (30 g) and methyl methacrylate (63 g) was added dropwise to the three-neck flask at a constant rate so that the dropwise addition was completed in 3 hours, and a mixed solution of V-501 (0.06 g), potassium bicarbonate (0.04 g), and water (6 g) was added thereto in two portions, immediately after the start of the above-described dropwise addition of the monomer solution and 1.5 hours after the start of the above-described dropwise addition of the monomer solution. After the above-described dropwise addition of the monomer solution, the mixture was stirred for 1 hour. Subsequently, a mixed solution of V-501 (0.06 g), potassium bicarbonate (0.04 g), and water (6 g) was added to the obtained reaction mixture, and the mixture was further stirred for 3 hours. The obtained reaction mixture was filtered through a mesh having a mesh size of 50 μm to obtain an aqueous dispersion of a resin particles P. The obtained aqueous dispersion of the resin particle P1 had a pH of 8.5, a concentration of solid contents (that is, a content of the resin particle P1) of 25% by mass, a volume average particle diameter of 30 nm (volume average particle diameter was measured by microtrac UPA EX-150 (manufactured by Nikkiso Co., Ltd.)), a weight-average molecular weight (Mw) of 250,000, and Tg of 96° C.

The resin particle P1 is an example of the resin particle P, and as the structural unit p-1, includes a structural unit derived from 12-methacrylamide dodecanoic acid. The details of the resin particle P1 are as described above.

<Preparation of Ink>

(Preparation of Pigment Dispersion)

-Synthesis of Water-Soluble Resin Dispersant Q-1-

Methacrylic acid (172 parts), benzyl methacrylate (828 parts), and isopropanol (375 parts) were mixed to prepare a monomer feed composition. In addition, 2,2-azobis(2-methylbutyronitrile) (22.05 parts) and isopropanol (187.5 parts) were mixed to prepare an initiator feed composition.

Next, isopropanol (187.5 parts) was heated to 80° C. under a nitrogen atmosphere, and a mixture of the monomer feed composition and the initiator feed composition was added dropwise thereto over 2 hours. After completion of the dropwise addition, the obtained solution was kept at 80° C. for another 4 hours and then cooled to 25° C.

After cooling, the solvent was removed under reduced pressure to obtain a water-soluble resin dispersant Q-1 having a weight-average molecular weight of approximately 30,000 and an acid value of 112 mgKOH/g.

-Preparation of Cyan Pigment Dispersion QC1-

After neutralizing 0.8 equivalent of methacrylic acid in the water-soluble resin dispersant Q-1 (150 parts) obtained above with an potassium hydroxide aqueous solution, the concentration of the water-soluble resin dispersant was adjusted to 25% by mass by further adding deionized water to obtain an aqueous solution of the water-soluble resin dispersant.

This aqueous solution of the water-soluble resin dispersant (124 parts), Pigment Blue 15:3 (cyan pigment) (48 parts), water (75 parts), and dipropylene glycol (30 parts) were mixed, and the mixture was dispersed with a beads mill (bead diameter: 0.1 mmφ, zirconia beads) to obtain an uncross-linked dispersion of resin-coated cyan pigment particles having a cyan pigment concentration of 15% by mass.

Denacol EX-321 (manufactured by Nagase ChemteX Corporation, cross-linking agent) (1.3 parts) and a boric acid aqueous solution (boric acid concentration: 4% by mass) (14.3 parts) were added to this uncross-linked dispersion (136 parts), and the mixture was reacted at 50° C. for 6 and a half hours and then cooled to 25° C. to obtain a cross-linked dispersion. Next, deionized water was added to the obtained cross-linked dispersion, and ultrafiltration was performed using a stirring type ultra holder (manufactured by ADVANTEC Co., Ltd.) and an ultrafiltration filter (manufactured by ADVANTEC Co., Ltd.; molecular weight cut-off: 50,000, Q0500076E ultrafilter). After purifying the cross-linked dispersion so that the concentration of dipropylene glycol in the cross-linked dispersion was 0.1% by mass or less, the cross-linked dispersion was concentrated until the pigment concentration was 15% by mass to obtain a cyan pigment dispersion QC1 (cyan pigment concentration: 15% by mass).

The obtained cyan pigment dispersion QC1 contained a cross-linked resin-coated cyan pigment having a structure in which at least a part of cyan pigments was coated with the water-soluble resin dispersant Q-1 cross-linked by the cross-linking agent.

-Preparation of Magenta Pigment Dispersion QM1-

A magenta pigment dispersion QM1 (pigment concentration: 15% by mass) was obtained by the same operation as the preparation of the cyan pigment dispersion, except that Pigment Blue 15:3 (cyan pigment) was changed to Pigment Red 122 (magenta pigment) of the same mass.

The obtained magenta pigment dispersion QM1 contained a cross-linked resin-coated magenta pigment having a structure in which at least a part of magenta pigments was coated with the water-soluble resin dispersant Q-1 cross-linked by the cross-linking agent.

(Preparation of Cyan (C) Ink)

The following components were mixed, and then coarse particles were removed using a 1 μm filter to obtain a cyan ink having the following composition.

-Composition of Cyan Ink-

- Cyan pigment dispersion liquid QC1 . . . 3% by mass as the cyan pigment concentration (5.1% by mass as the content of the cross-linked resin-coated cyan pigment)
- Ethylene glycol monohexyl ether (EGmHE) [organic solvent A] . . . 2% by mass
- Diethylene glycol (DEG) [organic solvent B] . . . 15% by mass
- Aqueous dispersion of resin particle P1 . . . 6% by mass as the amount of the resin particle P1
- Lauryl sulfobetaine [manufactured by TOKYO CHEMICAL INDUSTRY CO., LTD.; compound (1-1) described later as the betaine compound (1)] . . . 0.5% by mass
- Water . . . remaining amount of 100% by mass in total (Preparation of Magenta (M) Ink)

The following components were mixed, and then coarse particles were removed using a 1 μm filter to obtain a magenta ink having the following composition.

-Composition of Magenta Ink-

- Magenta pigment dispersion liquid QM1 . . . 5% by mass as the magenta pigment concentration (8.5% by mass as the content of the cross-linked resin-coated magenta pigment)
- Hexyl glycol (manufactured by FUJIFILM Wako Pure Chemical Corporation) [organic solvent A] . . . 2% by mass
- Diethylene glycol (DEG) . . . 15% by mass
- Resin particle dispersion of resin particle P1 . . . 6% by mass as the amount of the resin particle P1
- Lauryl sulfobetaine [manufactured by TOKYO CHEMICAL INDUSTRY CO., LTD.; compound (1-1) described later as the betaine compound (1)] . . . 0.5% by mass
- Water . . . remaining amount of 100% by mass in total <Evaluation>

The following evaluations were performed using the above-described cyan ink and magenta ink.

The results are shown in Table 1.

(Intercolor Bleeding (Line Width Difference M))

In order to evaluate the effect of suppressing intercolor bleeding in a case where a magenta line width image was formed on a cyan solid image, intercolor bleeding (line width difference M) described below was evaluated.

Cyan ink was applied to coated paper (trade name: "OK TOPCOAT+", manufactured by Oji Paper Co., Ltd.) as a recording medium to form a cyan solid image, and magenta ink was applied to the obtained cyan solid image in a form of a line width image of 25 pixels to form a magenta line width image.

Cyan ink and magenta ink were each applied by ejecting the ink under the following ejection conditions by a single-pass method.

-Ejection Conditions-

- Head: 1,200 dot per inch (dpi, 1 inch=2.54 cm)/20 inch-width piezo full line head
- Amount ejected: 2.4 pL
- Driving frequency: 30 kHz (recording medium transportation speed: 635 mm/sec)
- Distance between heads: 120 mm The line width of the magenta line width image formed on the cyan solid image was measured with a microscope.

The difference (hereinafter, also referred to as a "line width difference M") between the measurement result of the line width of the magenta line width image and the theoretical line width of 1,200 dpi×25 pixels of 529.2 μm was obtained, and based on the obtained line width difference M, intercolor bleeding (line width difference M) was evaluated according to the following evaluation standard.

In the following evaluation standard, the score having the best effect of suppressing intercolor bleeding is A.

-Evaluation Standard of Intercolor Bleeding (Line Width Difference M)-

- A: line width difference M was less than 200 μm.
- B: line width difference M was 200 or more and less than 300 μm.
- C: line width difference M was 300 or more and less than 500 μm.
- D: line width difference M was 500 μm or more.

(Intercolor Bleeding (Line Width Difference C))

In order to evaluate the effect of suppressing intercolor bleeding in a case where a magenta solid image was formed on a cyan line width image, intercolor bleeding (line width difference C) described below was evaluated.

Cyan ink was applied to a recording medium in a form of a line width image of 25 pixels to form a cyan line width image, and magenta ink was applied so as to cover the cyan line width image and surroundings thereof to form a magenta solid image.

The recording medium and ejection conditions were the same as those for the recording medium and ejection conditions in "intercolor bleeding (line width difference M)".

The line width of the cyan line width image under the magenta solid image was measured with a microscope.

The difference (hereinafter, also referred to as a "line width difference C") between the measurement result of the line width of the cyan line width image and the theoretical line width of 1,200 dpi×25 pixels of 529.2 μm was obtained, and based on the obtained line width difference C, intercolor bleeding (line width difference C) was evaluated according to the following evaluation standard.

In the following evaluation standard, the score having the best effect of suppressing intercolor bleeding (line width difference C) is A.

-Evaluation Standard of Intercolor Bleeding (Line Width Difference C)-

A: line width difference C was less than 200 μm.

B: line width difference C was 200 or more and less than 300 μm.

C: line width difference C was 300 or more and less than 500 μm.

D: line width difference C was 500 μm or more.

(Storage Stability of Ink (C, M))

The storage stability of the cyan (C) ink and the magenta (M) ink was evaluated as follows.

After preparing the ink, the viscosity (hereinafter, referred to as "viscosity before storage") of the ink which had been allowed to stand at 25° C. for 1 hour and the viscosity (hereinafter, referred to as "viscosity after storage") of the ink which had been stored under the conditions of 50° C. for 24 hours in a sealed state after the preparation of ink were measured. Both the viscosity before storage and the viscosity after storage were measured with VISCOMETER TV-22 (manufactured by TOKI SANGYO CO., LTD.) at 30° C. and 100 rpm (revolutions per minute). Here, the sealed state refers to a state in which, in a case where the contents are sealed in a container and heated at 50° C. for 24 hours, the amount of decrease in the mass of the contents is less than 1% by mass.

A value was obtained by subtracting the viscosity before storage from the viscosity after storage, and the storage stability of the ink was evaluated according to the following evaluation standard.

In the following evaluation standard, the score having the best storage stability of the ink is A.

-Evaluation Standard of Storage Stability of Ink (C, M)-

A: value obtained by subtracting the viscosity before storage from the viscosity after storage was less than 0.3 mPa·s.

B: value obtained by subtracting the viscosity before storage from the viscosity after storage was 0.3 mPa·s or more and less than 0.5 mPa·s.

C: value obtained by subtracting the viscosity before storage from the viscosity after storage was 0.5 mPa·s or more and less than 1.0 mPa·s.

D): value obtained by subtracting the viscosity before storage from the viscosity after storage was 1.0 mPa·s or more.

Example 2

The same operation as in Example 1 was performed except that the organic solvent A was not used in each of the preparation of cyan ink and the preparation of magenta ink (specifically, the organic solvent A was changed to water of the same mass).

The results are shown in Table 1.

Examples 3 to 6

The same operation as in Example 1 was performed except that the types of the betaine compounds were changed as shown in Table 1 in each of the preparation of cyan ink and the preparation of magenta ink.

The results are shown in Table 1.

The compounds (1-1) to (1-5) in Table 1 are as follows.

As the compound (1-1), lauryl sulfobetaine manufactured by TOKYO CHEMICAL INDUSTRY CO., LTD. was used.

As the compound (1-2), palmityl sulfobetaine manufactured by TOKYO CHEMICAL INDUSTRY CO., LTD. was used.

As the compound (1-3), caprylyl sulfobetaine manufactured by TOKYO CHEMICAL INDUSTRY CO., LTD. was used.

As the compound (1-4), SOFTAZOLINE (registered trademark) LSB-R manufactured by Kawaken Fine Chemicals Co., Ltd. was used.

As the compound (1-5), SOFTAZOLINE (registered trademark) LPB-R manufactured by Kawaken Fine Chemicals Co., Ltd. was used.

(1-1)

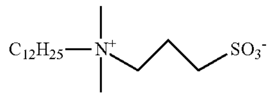

(1-2)

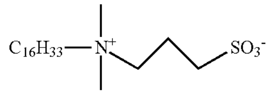

(1-3)

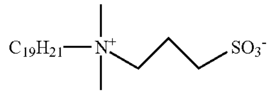

(1-4)

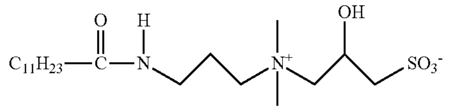

(1-5)

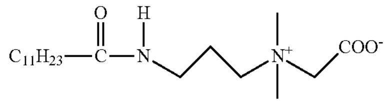

Example 7

The same operation as in Example 1 was performed except that, in each of the preparation of cyan ink and the preparation of magenta ink, the aqueous dispersion of the resin particle P1 was changed to an aqueous dispersion of a resin particle X1 having no structural unit p-1, thereby changing the resin particle P1 contained in each ink to the resin particle X1.

The results are shown in Table 1.

The aqueous dispersion of the resin particle X1 was prepared as follows.

(Preparation of Aqueous Dispersion of Resin Particle X1)

An aqueous dispersion of the resin particle X1 was prepared in the same manner as in the preparation of the aqueous dispersion of the resin particle P1, except that 12-methacrylamide dodecanoic acid was changed to methacrylic acid of the same mass.

Examples 8 and 9

The same operation as in Example 1 was performed except that the betaine compound (1) was used as the mass content in Table 1 in each of the preparation of cyan ink and the preparation of magenta ink.

Comparative Example 1

The same operation as in Example 1 was performed except that the betaine compound (1) was not used in each of the preparation of cyan ink and the preparation of magenta ink (specifically, the compound (1-1) was changed to water of the same mass).

The results are shown in Table 1.

Comparative Example 2

The same operation as in Example 1 was performed except that the cyan pigment dispersion QC1 used in the preparation of cyan ink was changed to an uncross-linked dispersion (specifically, the uncross-linked dispersion used in the preparation of the cyan pigment dispersion QC1) of the same mass, and the magenta pigment dispersion QM1 used in the preparation of magenta ink was changed to an uncross-linked dispersion (the uncross-linked dispersion used in the preparation of the magenta pigment dispersion QM1).

The results are shown in Table 1.

This Comparative Example 2 is an example in which the resin in the resin-coated pigment is not cross-linked.

Comparative Example 3

The same operation as in Example 2 was performed except that the cyan pigment dispersion QC1 used in the preparation of cyan ink was changed to an uncross-linked dispersion (specifically, the uncross-linked dispersion used in the preparation of the cyan pigment dispersion QC1) of the same mass, and the magenta pigment dispersion QM1 used in the preparation of magenta ink was changed to an uncross-linked dispersion (the uncross-linked dispersion used in the preparation of the magenta pigment dispersion QM1).

The results are shown in Table 1.

This Comparative Example 3 is an example in which the resin in the resin-coated pigment is not cross-linked.

Comparative Example 4

The same operation as in Comparative Example 2 was performed except that the betaine compound (1) was not used in each of the preparation of cyan ink and the preparation of magenta ink (specifically, the compound (1-1) was changed to water of the same mass).

The results are shown in Table 1.

Comparative Examples 5, 7, and 8

The same operation as in Example 1 was performed except that, in each of the preparation of cyan ink and the preparation of magenta ink, the compound (1-1) as the betaine compound (1) was changed to any one of the following compound (CX1), the following compound (CX2), or the following compound (CX3), which was a comparative betaine compound.

The results are shown in Table 1.

As the following compound (CX1), sulfobetaine manufactured by TOKYO CHEMICAL INDUSTRY CO., LTD. was used.

As the compound (CX2), betaine manufactured by TOKYO CHEMICAL INDUSTRY CO., LTD. was used.

As the compound (CX3), "C-2" described in paragraph 0206 of JP2014-65840A was used. The compound (CX3) is a polymer having a betaine structure, and Mw and compositional ratio (a/b) of the compound (CX3) are as follows. Here, the compositional ratio (a/b) is based on mass.

(CX1)

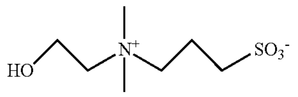

(CX2)

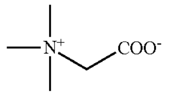

(CX3)

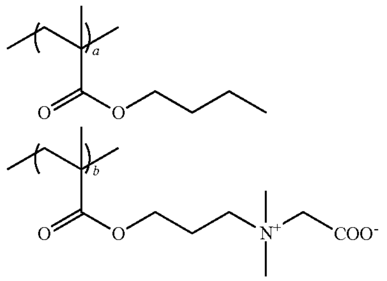

a/b = 84/16
Mw = 43,000

Comparative Example 6

The same operation as in Comparative Example 5 was performed except that the cyan pigment dispersion QC1 used in the preparation of cyan ink was changed to an uncross-linked dispersion (specifically, the uncross-linked dispersion used in the preparation of the cyan pigment dispersion QC1) of the same mass, and the magenta pigment dispersion QM1 used in the preparation of magenta ink was changed to an uncross-linked dispersion (the uncross-linked dispersion used in the preparation of the magenta pigment dispersion QM1).

The results are shown in Table 1.

TABLE 1

| | Ink composition (common to C ink and M ink) | | | | | | | | | | Evaluation result | | | |
|---|---|---|---|---|---|---|---|---|---|---|---|---|---|---|
| | Resin-coated pigment Presence or absence of cross-linking | Betaine compound (1) or comparative betaine compound | | | | Organic solvent A | | Resin particle | | | Intercolor bleeding Line width difference | | Storage stability | |
| | | Type | The number of carbon atoms in $R^1$ | $A^-$ | Amount (%) | Type | Amount (%) | Type | Unit p-1 | Amount (%) | C | M | C | M |
| Example 1 | Y | (1-1) | 12 | $SO_3^-$ | 0.5 | EGmHE | 2.0 | P1 | Y | 6.0 | A | A | A | A |
| Example 2 | Y | (1-1) | 12 | $SO_3^-$ | 0.5 | — | — | P1 | Y | 6.0 | A | A | A | A |
| Example 3 | Y | (1-2) | 16 | $SO_3^-$ | 0.5 | EGmHE | 2.0 | P1 | Y | 6.0 | A | A | A | A |

TABLE 1-continued

| | Ink composition (common to C ink and M ink) | | | | | | | | | | Evaluation result | | | |
|---|---|---|---|---|---|---|---|---|---|---|---|---|---|---|
| | Resin-coated pigment Presence or absence of cross-linking | Betaine compound (1) or comparative betaine compound | | | | Organic solvent A | | Resin particle | | | Intercolor bleeding Line width difference | | Storage stability | |
| | | Type | The number of carbon atoms in $R^1$ | $A^-$ | Amount (%) | Type | Amount (%) | Type | Unit p-1 | Amount (%) | C | M | C | M |
| Example 4 | Y | (1-3) | 10 | $SO_3^-$ | 0.5 | EGmHE | 2.0 | P1 | Y | 6.0 | A | A | A | A |
| Example 5 | Y | (1-4) | 11 | $SO_3^-$ | 0.5 | EGmHE | 2.0 | P1 | Y | 6.0 | A | A | A | A |
| Example 6 | Y | (1-5) | 11 | $COO^-$ | 0.5 | EGmHF | 2.0 | P1 | Y | 6.0 | B | B | A | A |
| Example 7 | Y | (1-1) | 12 | $SO_3^-$ | 0.5 | EGmHE | 2.0 | X1 | N | 6.0 | A | A | B | B |
| Example 8 | Y | (1-1) | 12 | $SO_3^-$ | 0.1 | EGmHE | 2.0 | P1 | Y | 6.0 | B | B | A | A |
| Example 9 | Y | (1-1) | 12 | $SO_3^-$ | 2.0 | EGmHE | 2.0 | P1 | Y | 6.0 | A | A | B | B |
| Comparative example 1 | Y | — | — | — | — | EGmHE | 2.0 | P1 | Y | 6.0 | C | C | A | A |
| Comparative example 2 | N | (1-1) | 12 | $SO_3^-$ | 0.5 | EGmHE | 2.0 | P1 | Y | 6.0 | A | A | D | D |
| Comparative example 3 | N | (1-1) | 12 | $SO_3^-$ | 0.5 | — | — | P1 | Y | 6.0 | A | A | C | C |
| Comparative example 4 | N | — | — | — | — | EGmHE | 2.0 | P1 | Y | 6.0 | C | C | B | B |
| Comparative example 5 | Y | (CX1) | 2 | $SO_3^-$ | 0.5 | EGmHE | 2.0 | P1 | Y | 6.0 | C | C | A | A |
| Comparative example 6 | N | (CX1) | 2 | $SO_3^-$ | 0.5 | EGmHE | 2.0 | P1 | Y | 6.0 | C | C | A | A |
| Comparative example 7 | Y | (CX2) | 1 | $COO^-$ | 0.5 | EGmHE | 2.0 | P1 | Y | 6.0 | C | C | A | A |
| Comparative example 8 | Y | (CX3) | 20< | $COO^-$ | 0.5 | EGmHE | 2.0 | P1 | Y | 6.0 | C | C | A | A |

As shown in Table 1, in Examples 1 to 9 in which an ink including a resin-coated pigment in which at least a part of pigments was coated with a cross-linked resin, a betaine compound (1), and water was used, the intercolor bleeding of the image was suppressed and the storage stability of the ink was excellent.

On the other hand, in Comparative Examples 1 and 4 in which the betaine compound (1) was not contained, the intercolor bleeding of the image was deteriorated.

In addition, in Comparative Examples 2 and 3 in which the betaine compound (1) was contained but the resin in the resin-coated pigment was not cross-linked, the storage stability of the ink decreased. The reason for this is that the resin in the resin-coated pigment and the betaine compound (1) interact with each other, so that the resin is peeled off from the pigment in the resin-coated pigment. As a result, it is considered that the dispersion stability of the ink decreases. In contrast to Comparative Examples 2 and 3, in Examples 1 to 9, the resin in the resin-coated pigment is cross-linked, so that the peeling of the resin from the pigment in the resin-coated pigment can be suppressed. As a result, it is considered that the decrease in storage stability of the ink is suppressed.

In addition, in Comparative Examples 5 to 8 in which the comparative betaine compound was used instead of the betaine compound (1), the intercolor bleeding of the image was deteriorated.

From the results of Comparative Examples 2, 3, and 6, in which the resin in the resin-coated pigment was not cross-linked, in a case where a betaine compound (1) having 6 to 20 carbon atoms in $R^1$ is used (Comparative Examples 2 and 3), compared with a case where the number of carbon atoms in $R^1$ is less than 6 or more than 20 (Comparative Example 6), it can be seen that the storage stability of the ink tends to decrease while the effect of suppressing intercolor bleeding is excellent.

In contrast to Comparative Examples 2 and 3, in Examples 1 to 9 in which the resin in the resin-coated pigment is cross-linked, although the betaine compound (1) having 6 to 20 carbon atoms in $R^1$ is used, the storage stability of the ink is excellent.

As described above, in a case where the resin in the resin-coated pigment is cross-linked, it can be seen that the problem peculiar to the use of the betaine compound (1) having 6 to 20 carbon atoms in $R^1$ (decrease in storage stability of the ink) is solved.

In addition, from the results of Comparative Examples 2 and 3, it can be seen that, in a case where the ink includes the organic solvent A (Comparative Example 2), the storage stability of the ink particularly tends to decrease. The reason for this is that the organic solvent A has a high affinity with the resin (resin dispersant) in the resin-coated pigment, so that the resin is easily peeled off from the pigment (pigment dispersant) in the resin-coated pigment.

In contrast to Comparative Example 2, in Examples 1 and 3 to 9 in which the resin in the resin-coated pigment is cross-linked, although the organic solvent A is contained, the storage stability of the ink was excellent.

Therefore, in a case where the resin in the resin-coated pigment is cross-linked, it can be seen that the problem peculiar to the use of the organic solvent A (decrease in storage stability of the ink) is solved.

In addition, from the results of Example 1 and 7, in a case where the resin particle P1 having the unit p-1 is contained (Example 1), compared with a case where the resin particle X1 not having the unit p-1 is contained (Example 7), it can be seen that the storage stability of the ink is further improved. The reason for this is that the betaine compound (1) is trapped in the resin particle P1 by the interaction between the unit p-1 in the resin particle P1 and the betaine compound (1). As a result, it is considered that the influence of the betaine compound (1) on the resin in the resin-coated pigment is further reduced.

What is claimed is:

1. An ink composition comprising:

(a) cross-linked resin-coated pigment particles each having a volume average particle diameter, comprising:

pigment particles each having a volume average particle diameter; and a cross-linked resin, coated on at least a part of each of the pigment particles;

(b) a betaine compound (1) represented by Formula (1); and (c) water, (1)

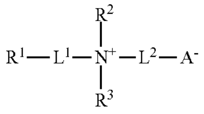

in Formula (1), $R^1$ represents an alkyl group having 6 to 20 carbon atoms, $R^2$ and $R^3$ each independently represent a chain hydrocarbon group having 1 to 5 carbon atoms, $L^1$ represents a single bond or a divalent linking group, $L^2$ represents a divalent linking group, and A represents a $—SO_3^-$ group.

2. The ink composition according to claim 1, wherein a molecular weight of the betaine compound (1) is 1000 or less.

3. The ink composition according to claim 1, further comprising:

an organic solvent A which is a compound represented by Formula (A1) or Formula (A2), (A1)

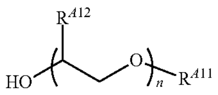

(A2)

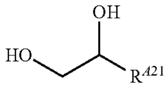

in Formula (A1), $R^{A11}$ represents a chain hydrocarbon group having 4 to 9 carbon atoms or an aryl group having 6 to 10 carbon atoms, $R^{A12}$ represents a hydrogen atom or a methyl group, and n represents an integer of 1 to 3, and in Formula (A2), $R^{A21}$ represents a chain hydrocarbon group having 4 to 9 carbon atoms or an aryl group having 6 to 10 carbon atoms.

4. The ink composition according to claim 3, wherein a ratio of a mass content of the organic solvent A to a mass content of the betaine compound (1) is 0.5 to 100.

5. The ink composition according to claim 1, further comprising:

(d) a resin particle.

6. The ink composition according to claim 5, wherein the resin particle includes a resin particle P consisting of a resin including a structural unit p-1 represented by Formula (p-1), (p-1)

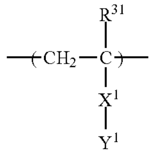

in Formula (p-1), $R^{31}$ represents a hydrogen atom or an alkyl group having 1 to 4 carbon atoms, $X^1$ represents a divalent linking group, $Y^1$ represents an anionic group, a main chain of Formula (p-1) has a tetravalent carbon that is directly connected to $X^1$, and among atoms in $X^1$ and $Y^1$, an atom that is farthest from a main chain of Formula (p-1) is within a range of a 4th atom to a 27th atom away from the tetravalent carbon atom.

7. The ink composition according to claim 6, wherein a proportion of the structural unit p-1 in the resin including the structural unit p-1 is 1% by mass to 20% by mass.

8. An ink set comprising:

two or more kinds of inks, wherein at least one of the two or more kinds of inks is the ink composition according to claim 1.

9. An image forming method comprising:

applying a first ink, which is the ink composition according to claim 1, to a recording medium; and applying a second ink, which contains a coloring material and water and has a hue different from a hue of the first ink, to the first ink applied to the recording medium.

* * * * *